US012142233B1

(12) United States Patent
Furihata et al.

(10) Patent No.: US 12,142,233 B1
(45) Date of Patent: Nov. 12, 2024

(54) COLOR COMPENSATION FOR PANEL DISPLAY DEVICE USING LIGHT SOURCE ARRAY FOR BACKLIGHTING

(71) Applicant: Synaptics Incorporated, San Jose, CA (US)

(72) Inventors: Hirobumi Furihata, Tokyo (JP); Takashi Nose, Kanagawa (JP); Masao Orio, Tokyo (JP); Kazutoshi Aogaki, Kanagawa (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 18/345,399

(22) Filed: Jun. 30, 2023

(51) Int. Cl.
*G09G 3/34* (2006.01)
*G09G 3/36* (2006.01)

(52) U.S. Cl.
CPC ............. *G09G 3/3426* (2013.01); *G09G 3/36* (2013.01); *G09G 2320/0233* (2013.01); *G09G 2320/0242* (2013.01); *G09G 2320/0646* (2013.01); *G09G 2320/0686* (2013.01); *G09G 2360/16* (2013.01)

(58) Field of Classification Search
CPC ................... G09G 3/3426; G09G 3/36; G09G 2320/0233; G09G 2320/0242; G09G 2320/0646; G09G 2320/0686; G09G 2360/16
See application file for complete search history.

(56) References Cited

U.S. PATENT DOCUMENTS 4,980,678 A * 12/1990 Zenda .................. G09G 3/2007 345/3.1
2003/0179171 A1* 9/2003 Toriumi ............... G09G 3/3688 345/89
2007/0075950 A1* 4/2007 Yamada ............... G09G 3/3648 345/89
2010/0253711 A1 10/2010 Muroi
2017/0221426 A1* 8/2017 Inamura ............... G09G 3/3426

* cited by examiner

*Primary Examiner* — Gene W Lee
(74) *Attorney, Agent, or Firm* — Leydig, Voit & Mayer, Ltd.

(57) ABSTRACT

A display device that includes a display panel, a backlight device, and a display driver. The backlight device includes light sources configured such that color of light emitted from the light sources varies with luminance levels. The display driver is configured to: process a first input grey level of a first color for a target pixel based on a specified luminance level of a corresponding light source to determine a first output grey level of the first color for the target pixel; and configured to process a second input grey level of a second color for the target pixel based on the specified luminance level to determine a second output grey level of the second color for the target pixel. The first output grey level and the second output grey level are determined to compensate for a change in color of light emitted from the corresponding light source.

17 Claims, 19 Drawing Sheets

COLOR COMPENSATION FOR PANEL DISPLAY DEVICE USING LIGHT SOURCE ARRAY FOR BACKLIGHTING

FIELD

The disclosed technology relates generally to display devices and more particularly to color compensation for panel display devices using a light source array for backlighting.

BACKGROUND

Display devices with a light-transmissive display panel, such as a light-transmissive liquid crystal display (LCD) panel, incorporate a backlighting system to illuminate the light-transmissive display panel. Modern backlighting systems (e.g., direct-lit backlighting, full-array backlighting, etc.) may illuminate a display panel with an array of light sources (e.g., light-emitting diodes (LEDs)) located directly behind the display panel. Using an array of light sources for backlighting allows for local dimming, which may provide brighter or darker portions of the display image to enhance the contrast of the display image.

SUMMARY

This summary is provided to introduce in a simplified form a selection of concepts that are further described below in the detailed description. This summary is not intended to identify key features or essential features of the claimed subject matter, nor is it intended to limit the scope of the claimed subject matter.

In general, in one aspect, one or more embodiments relate to a display device that includes a display panel, a backlight device, and a display driver. The backlight device includes a plurality of light sources to illuminate the display panel. The plurality of light sources are configured such that color of light emitted from the plurality of light sources varies with luminance levels of the plurality of light sources. The display driver is configured to process a first input grey level of a first color for a target pixel of the display panel based at least in part on a specified luminance level of a corresponding light source of the plurality of light sources to determine a first output grey level of the first color for the target pixel. The display driver is further configured to process a second input grey level of a second color for the target pixel based at least in part on the specified luminance level of the corresponding light source to determine a second output grey level of the second color for the target pixel. The first output grey level and the second output grey level are determined to compensate for a change in color of light emitted from the corresponding light source. The display driver is further configured to update the target pixel based on the first output grey level and the second output grey level.

In general, in one aspect, one or more embodiments relate to a display driver that includes a color compensation block and driver circuitry. The color compensation block is configured to process a first input grey level of a first color for a target pixel of a display panel to determine a first output grey level of the first color for the target pixel. The display panel is illuminated by a backlight device comprising a plurality of light sources configured such that color of light emitted from the plurality of light sources varies with luminance levels of the plurality of light sources. Processing the first input grey level is based at least in part on a specified luminance level of a corresponding light source of the plurality of light sources. The color compensation block is further configured to process a second input grey level of a second color for the target pixel based at least in part on the specified luminance level of the corresponding light source to determine a second output grey level of the second color for the target pixel. The first output grey level and the second output grey level are determined to compensate for a change in color of light emitted from the corresponding light source. The driver circuitry is configured to update the target pixel based on the first output grey level and the second output grey level.

In general, in one aspect, one or more embodiments relate to a method for color compensation for a display device that includes a display panel illuminated by a backlight device including a plurality of light sources. The plurality of light sources are configured such that color of light emitted from the plurality of light sources varies with luminance levels of the plurality of light sources. The method includes processing a first input grey level of a first color for a target pixel of a display panel to determine a first output grey level of the first color for the target pixel. Processing the first input grey level is based at least in part on a specified luminance level of a corresponding light source of the plurality of light sources. The method further includes processing a second input grey level of a second color for the target pixel based at least in part on the specified luminance level of the corresponding light source to determine a second output grey level of the second color for the target pixel. The first output grey level and the second output grey level are determined to compensate for a change in color of light emitted from the corresponding light source. The method further includes updating the target pixel based on the first output grey level and the second output grey level.

Other aspects of the embodiments will be apparent from the following description and the appended claims.

BRIEF DESCRIPTION OF DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

Figure 1:
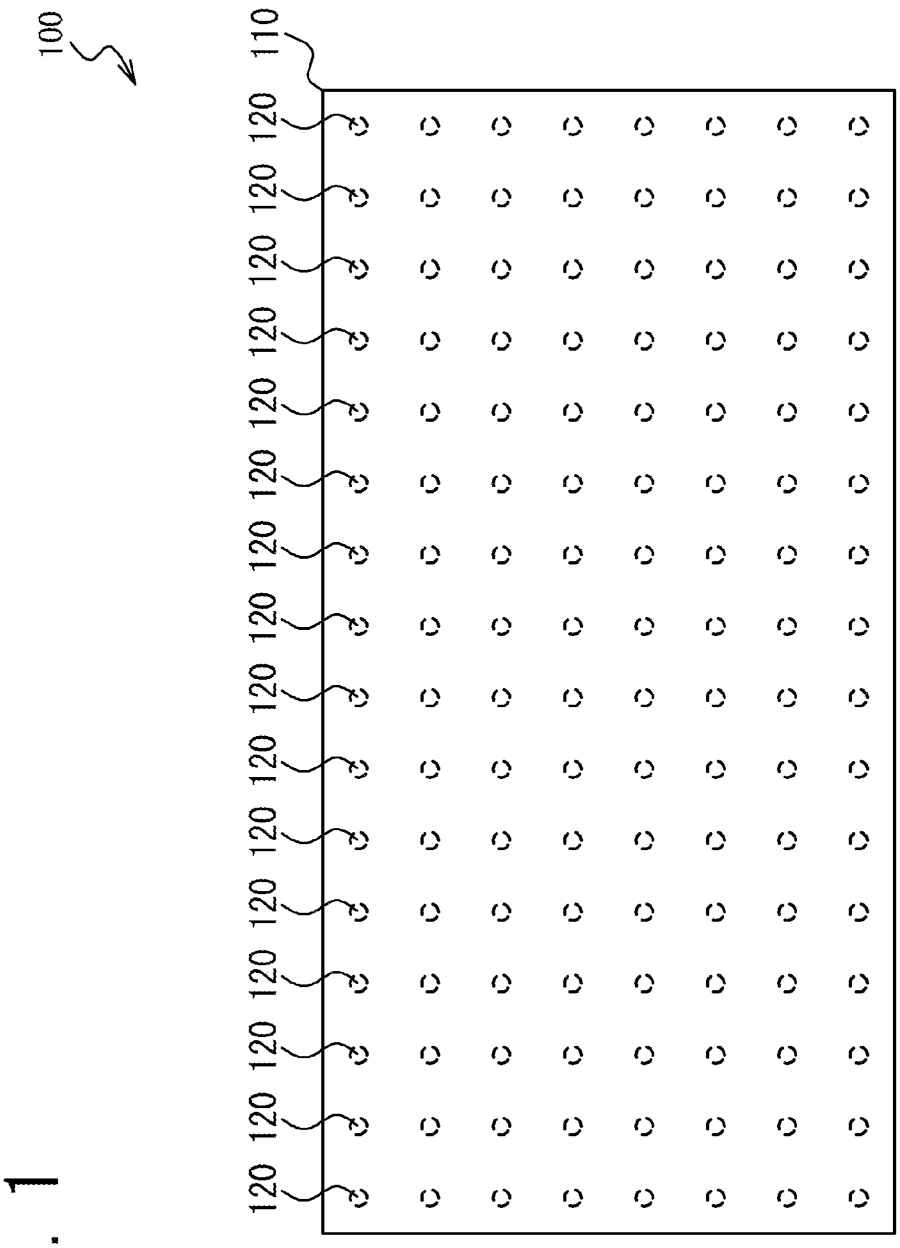
FIG. 1 shows an example display device that includes a display panel illuminated by an array of light sources, according to one or more embodiments.

To facilitate understanding, identical reference numerals have been used, where possible, to designate identical elements that are common to the figures. It is contemplated that elements disclosed in one embodiment may be beneficially utilized in other embodiments without specific recitation. Suffixes may be attached to reference numerals for distinguishing identical elements from each other. The drawings referred to herein should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature, and is not intended to limit the disclosed technology or the application and uses of the disclosed technology. Furthermore, there is no intention to be bound by any expressed or implied theory presented in the preceding technical field, background, or the following detailed description.

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

The term "coupled" as used herein means connected directly to or connected through one or more intervening components or circuits. Further, throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Display devices with a light-transmissive display panel, such as a light-transmissive liquid crystal display (LCD) panel, may be configured to illuminate the display panel with an array of light sources (such as light emitting diodes (LEDs)) located directly behind the display panel. Such backlighting technologies may be referred to as direct-lit backlighting or full-array backlighting. The light sources may each be configured to illuminate corresponding areas or zones of the display panel.

In some implementations, the luminance levels of the light sources may be individually controlled to achieve "local dimming." "Local dimming" is a technique for enhancing image contrast by individually controlling the luminance levels of the respective light sources to provide brighter and/or darker portions of the display image. For example, the luminance level of a light source illuminating a particular zone of the display panel may be reduced when a darker image is desired in that zone. The luminance levels of the light sources may be controlled based on image data which may specify grey levels of respective colors (e.g., red (R), green (G) and blue (B)) for respective pixels of the display panel.

A potential problem with local dimming is that the color of the light emitted by the light sources may change with the luminance levels, causing unwanted coloration in the display image. LEDs, which are widely used as light sources to illuminate a display panel, may exhibit color changes with the luminance levels depending on the manufacturing process and/or the driving technique of the LEDs. For example, the light emitted by some LEDs may become reddish as the luminance level decreases. When such LEDs are used as light sources to illuminate a display panel, the local dimming technique, in which the luminance levels of the light sources are adjusted individually, may cause unwanted coloration in the display image due to changes in the color emitted by the light sources.

The present disclosure provides various technologies for mitigating unwanted display image coloration potentially caused by color changes of light sources with the luminance levels. In one or more embodiments, a display device includes a display panel, a backlight device, and a display driver. The backlight device may include a plurality of light sources to illuminate the display panel. The plurality of light sources may be configured such that the color of the light emitted from the light sources varies with the luminance levels of the light sources. The display driver may be configured to process a first input grey level of a first color for a target pixel of the display panel based at least in part on a specified luminance level of a corresponding light source of the plurality of light sources to determine a first output grey level of the first color for the target pixel. The display driver may be further configured to process a second input grey level of a second color for the target pixel based at least in part on the specified luminance level of the corresponding light source to determine a second output grey level of the second color for the target pixel. The first output grey level and the second output grey level are determined to compensate for a change in color of light emitted from the corresponding light source. The display driver may be further configured to update the target pixel based on the first output grey level and the second output grey level. The following is a detailed description of various embodiments of the present disclosure.

FIG. 1 shows an example display device 100 that includes a display panel 110 illuminated by an array of light sources 120. It is noted that the light sources 120 are shown in phantom, as the light sources 120 are actually located behind the display panel 110. It is further noted that, although the array of the light sources 120 comprises multiple rows, only the first is labelled with reference numerals. To achieve local dimming, the luminance levels of the light sources 120 may be individually controlled adaptively to the display image. Light sources 120 that illuminate areas or zones of the display panel 110 in which bright portions of the display image are displayed may be controlled to emit light with increased luminance levels. Correspondingly, light sources 120 that illuminate areas or zones of the display panel 110 in which dark portions of the display image are displayed may be controlled to emit light at reduced luminance levels.

Figure 2A:
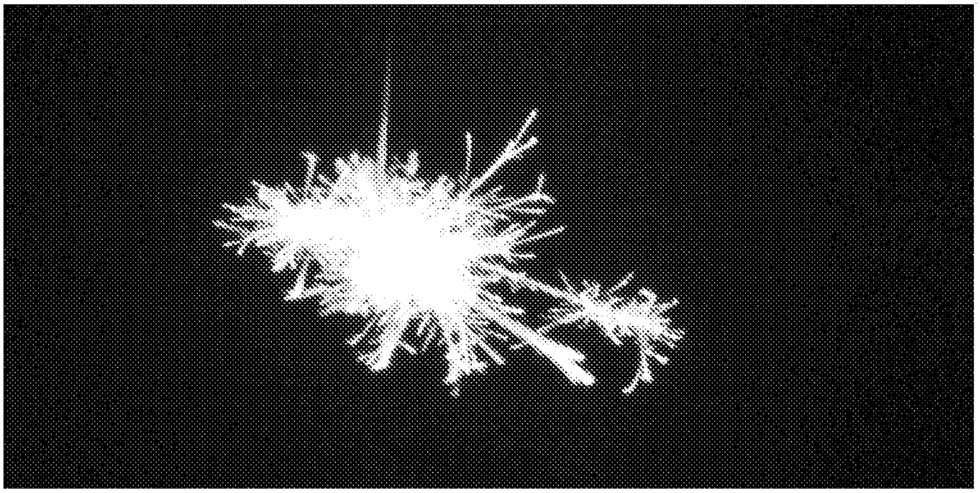
FIG. 2A shows an example display image displayed on a display panel, according to one or more embodiments.
Figure 2B:
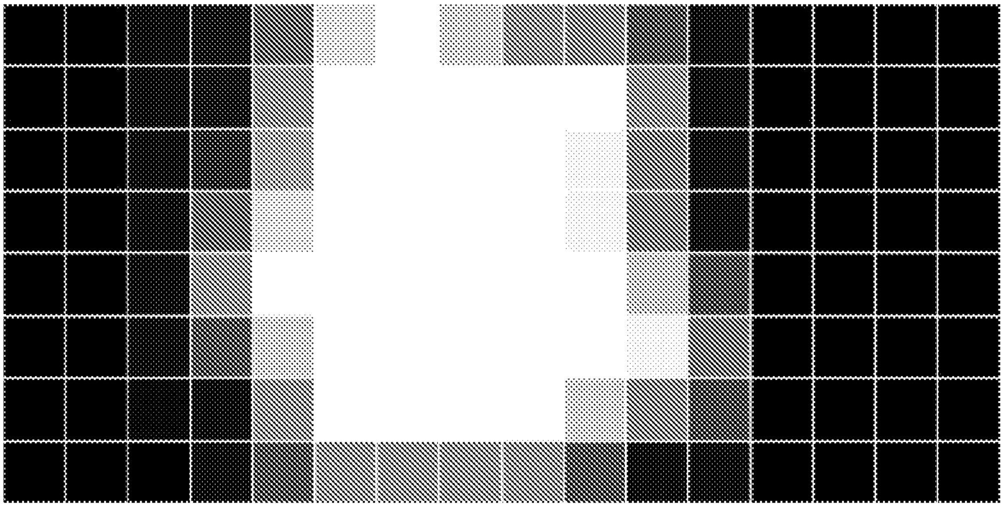
FIG. 2B shows an example distribution of the luminance levels of light sources determined by "local dimming" for the display image shown in FIG. 2A, according to one or more embodiments.

FIG. 2A shows an example display image displayed on the display panel 110, and FIG. 2B shows an example distribution of the luminance levels of the light sources 120 determined by "local dimming" for the display image shown in FIG. 2A. The display image shown in FIG. 2A includes brighter areas and darker areas, and the luminance levels of the respective light sources 120 are adjusted based on the luminance levels of the corresponding areas. In FIG. 2B, the luminance level of each light source 120 is indicated by the shading of each zone. Zones with light shading indicate that the light sources 120 illuminating those zones are emitting light with increased luminance levels, while zones with dark shading indicate that the light sources 120 illuminating those zones are emitting light with decreased luminance levels. The "local dimming" technique dynamically adjusts the luminance levels of the respective light sources 120 according to the luminance levels of the respective zones of the display panel.

Figure 3:
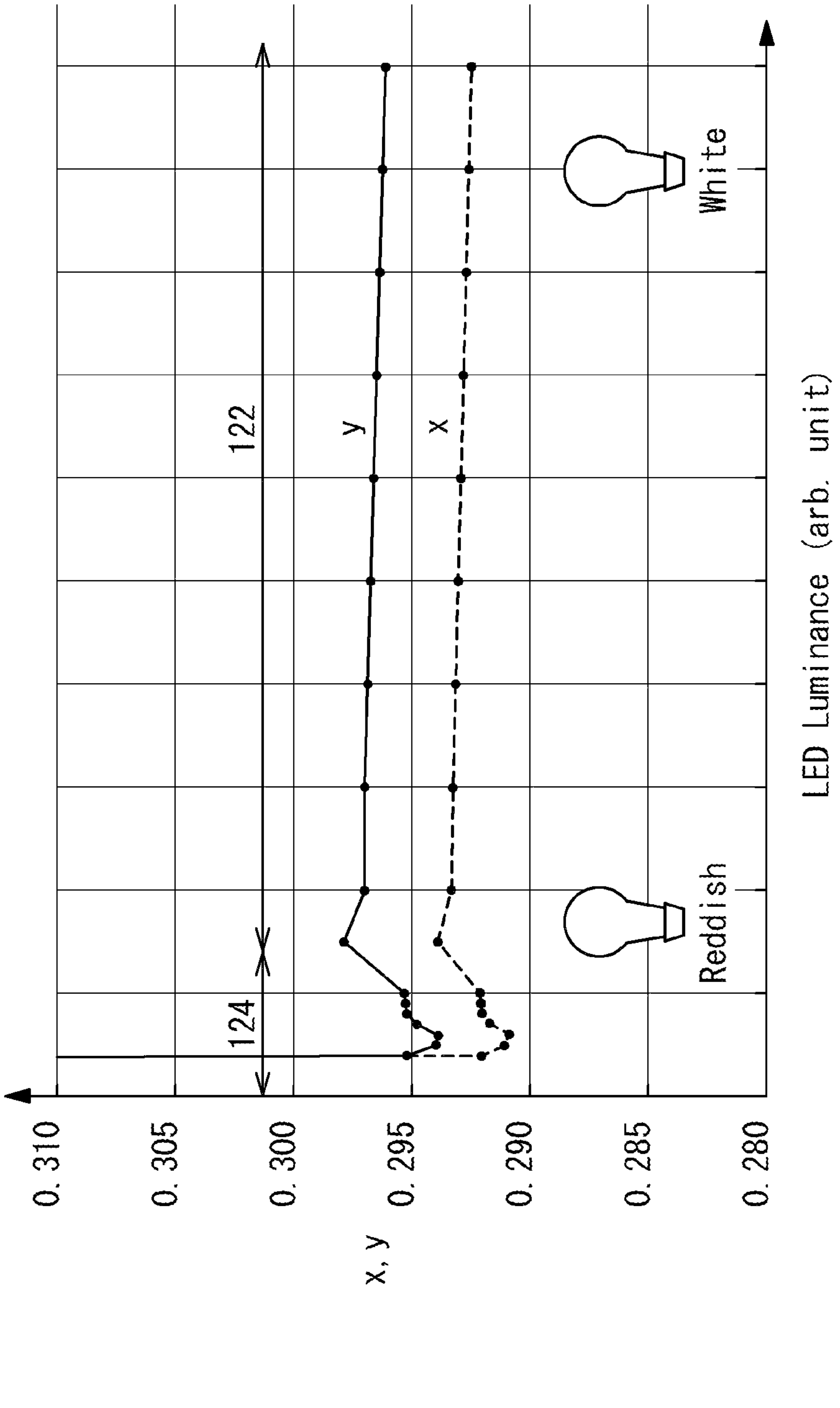
FIG. 3 shows an example of color changes of an LED, according to one or more embodiments.

One issue with the local dimming technique is that some types of light sources, including LEDs, exhibit color changes with the luminance level, which may cause unwanted coloration of portions of the display image depending on the luminance levels of the portions. FIG. 3 shows an example of color changes of an LED, according to one or more embodiments. In FIG. 3, the horizontal axis represents the luminance level of the LED and the vertical axis represents the x and y color coordinates of the color of the light emitted by the LED in the Yxy color space. It is noted that the Yxy color space is a standardized color space defined in 1931 by Commission internationale de l'Eclairage (CIE). In the example shown in FIG. 3, the x and y coordinates of the light emitted by the LED both increase as the luminance level of the LED decreases in the in-use range 122, except for unstable behaviors in the reduced luminance range 124. Due to the changes in the x and y coordinates shown in FIG. 3, the light emitted from the LED becomes reddish as the luminance level of the LED decreases. Note that an increase in the x coordinate in the Yxy color space means an increase in the red component of the color. The color changes with the luminance levels of the light sources 120 may cause undesirable coloration of the display image on the display panel 110.

Figure 4:
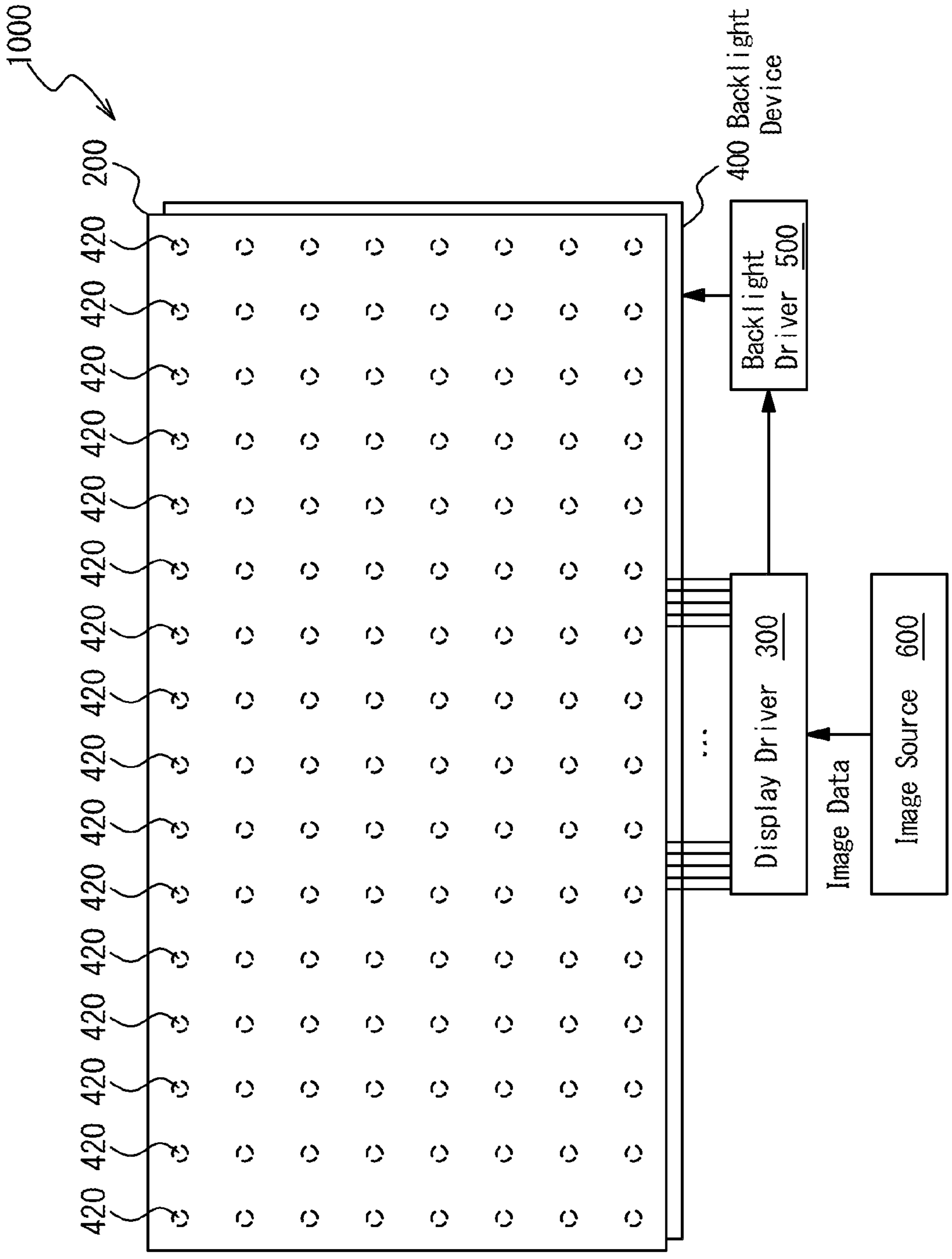
FIG. 4 shows an example configuration of a display device, according to one or more embodiments.

FIG. 4 shows an example configuration of a display device 1000 configured to mitigate unwanted coloration of the display image, according to one or more embodiments. The display device 1000 includes a display panel 200 and is configured to display desired images on the display panel 200. The display panel 200 may be a light-transmissive display panel, such as an LCD panel. While the display panel 200 is in a rectangular shape in the shown embodiment, the display panel 200 may have a different shape (e.g., a rectangular shape with one or more notches, an oval shape, a hexagonal shape, or an octagonal shape).

The display device 1000 further includes a display driver 300, a backlight device 400, and a backlight driver 500. The display driver 300 is configured to receive image data from an image source 600 and drive the display panel 200 to display an image corresponding to the image data. The image source 600 may be a processor such as an application processor, a host, a central processing unit (CPU), a microprocessor unit (MPU) or a different type of processor configured to provide the image data.

Figure 5:
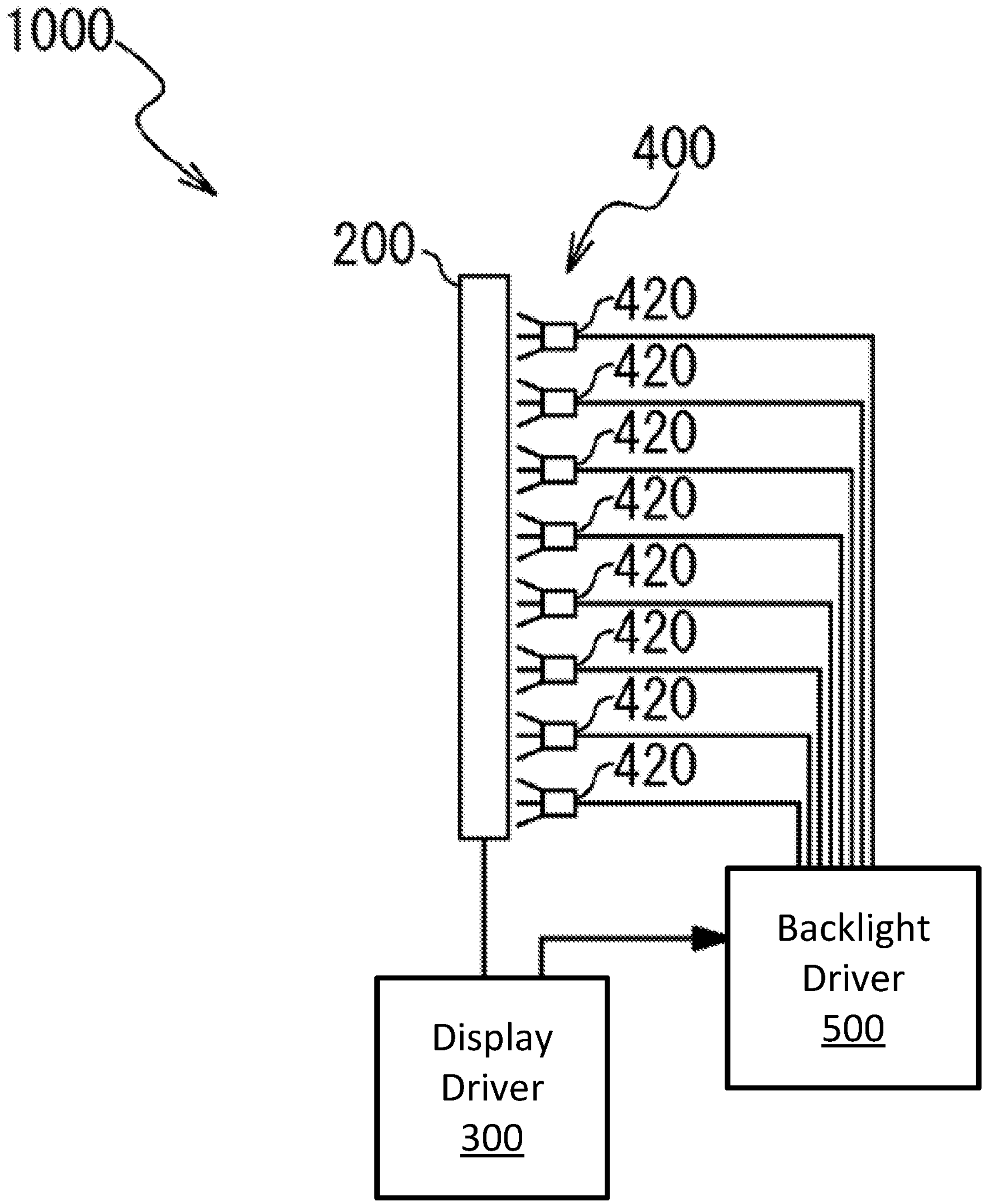
FIG. 5 shows an example side view configuration of the display device shown in FIG. 4, according to one or more embodiments.

The backlight device 400 and the backlight driver 500 form a backlighting system. The backlight device 400 is configured to illuminate the display panel 200 with an array of light sources 420. Since the light sources 420 are positioned behind the display panel 200 as shown in FIG. 5, the light sources 420 are shown in phantom in FIG. 4. The light sources 420 are located directly behind the display panel 200 to oppose the display panel 200 and configured to illuminate corresponding areas or zones of the display panel 200. In the shown embodiment, the light sources 420 are spaced at regular intervals to illuminate the display panel 200 as uniformly as possible. In one implementation, each light source 420 includes one or more LEDs. In an alternative implementation, each light source 420 may include a different type of light source. While FIG. 4 shows 128 (=16×8) light sources 420, those skilled in the art would appreciate that the backlight device 400 may include more or less than 128 light sources 420. The backlight driver 500 is configured to drive the light sources 420 of the backlight device 400 under the control of the display driver 300 such that each light source 420 emits light with a luminance level specified by the display driver 300.

Figure 6:
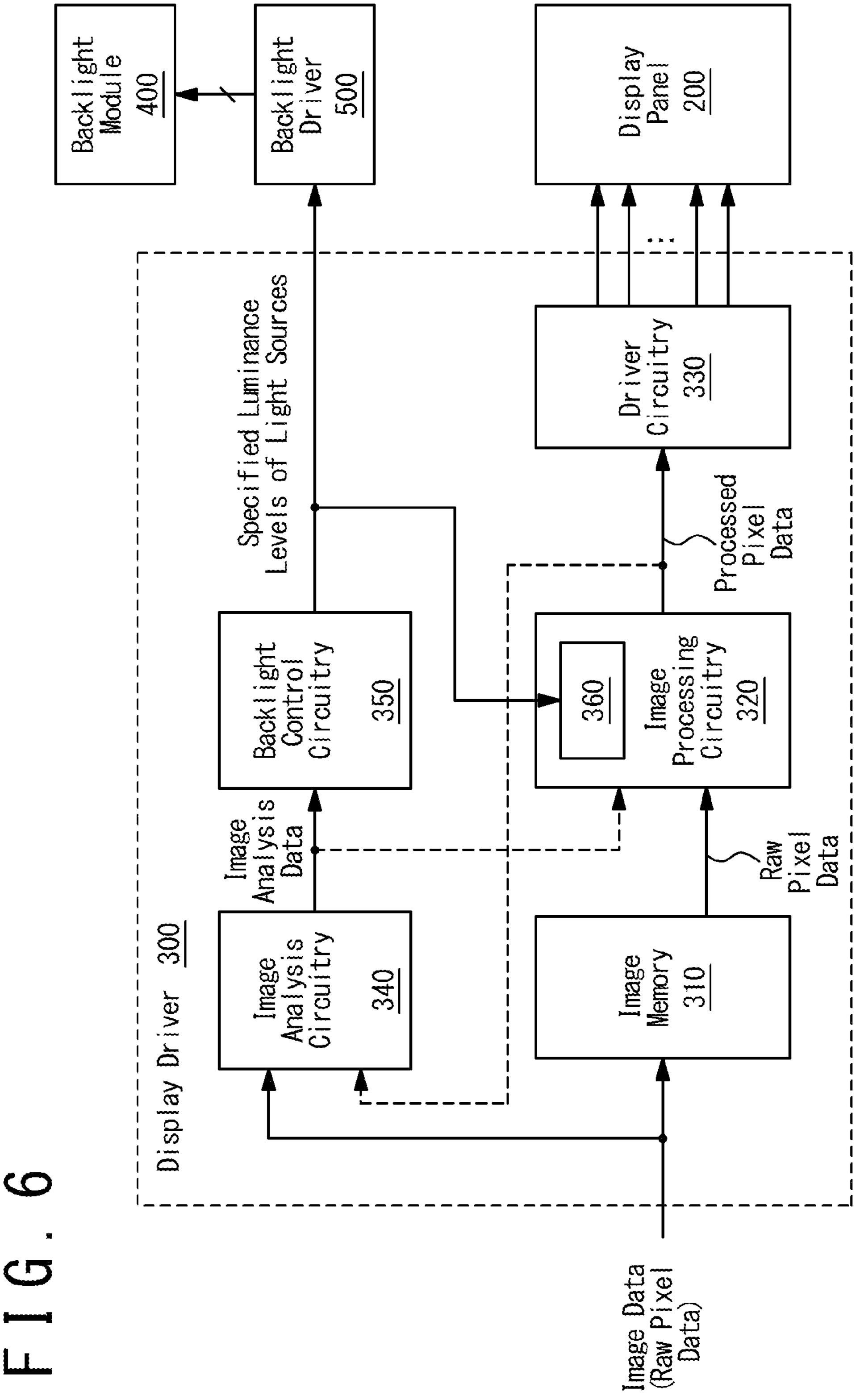
FIG. 6 shows an example configuration of a display driver, according to one or more embodiments.

FIG. 6 shows an example configuration of the display driver 300, according to one or more embodiments. In the shown embodiment, the display driver 300 includes an image memory 310, image processing circuitry 320, driver circuitry 330, image analysis circuitry 340, and backlight control circuitry 350.

The image memory 310 is configured to receive image data corresponding to a display image to be displayed on the display panel 200 from the image source 600 (shown in FIG. 4) and store the received image data therein. In one implementation, the image data includes raw pixel data for respective pixels of the display panel 200. In one implementation, raw pixel data for each pixel may include grey levels of respective primitive colors (e.g., red (R), green (G), and blue (B)). In one implementation, each pixel of the display panel 200 may include R, G, and B subpixels configured to display red, green, and blue colors, respectively, and raw pixel data for each pixel may include R, G, and B grey levels that specify the luminance levels of the R, G, and B subpixels, respectively. In an alternative embodiment, the image memory 310 may be omitted and the raw pixel data may be provided directly to the image processing circuitry 320.

The image processing circuitry 320 is configured to apply image processing to the raw pixel data retrieved from the image memory 310 to generate processed pixel data. The image processing circuitry 320 includes a color compensation block 360 configured to perform color compensation to mitigate unwanted coloration potentially caused by color changes of light emitted by the light sources 420. The details of the color compensation will be described in detail later. The image processing performed by the image processing circuitry 320 may further include color adjustment, demura correction, deburn correction, image scaling, gamma transformation, or other image processing.

The driver circuitry 330 is configured to receive the processed pixel data from the image processing circuitry 320 and drive or update the pixels of the display panel 200 based at least in part on the processed pixel data. The driver circuitry 330 may include a source driver (also referred to as a data driver) configured to generate data voltages based on the processed pixel data and drive source lines (also referred to as data lines) of the display panel 200 to program or update the pixels of the display panel 200 with the generated data voltages. In one implementation, each pixel of the display panel 200 may include R, G, and B subpixels and the processed pixel data may specify the luminance level of each of the R, G, and B subpixels of each pixel. The driver circuitry 330 may be configured to program or update the R, G, and B subpixels of each pixel based at least in part on the processed pixel data to control the luminance levels of the R, G, and B subpixels.

The image analysis circuitry 340 and the backlight control circuitry 350 are collectively configured to generate and provide backlight control instructions to the backlight driver 500 based at least in part on the image data to control the luminance levels of the respective light sources 420 (shown in FIGS. 4 and 5) of the backlight device 400. In one embodiment, the raw pixel data is provided to the image analysis circuitry 340. In an alternative embodiment, the processed pixel data generated by the image processing circuitry 320 may be provided to the image analysis circuitry 340 instead of the raw pixel data as indicated by the dotted arrow from the image processing circuitry 320 to the image analysis circuitry 340. The image analysis circuitry 340 is configured to analyze the raw pixel data or the processed pixel data to generate image analysis data. The image analysis data may be indicative of a luminance distribution of the display image to be displayed on the display panel 200. The backlight control circuitry 350 is configured to control the luminance of each light source 420 based at least in part on the image analysis data. The image analysis data may also be provided to the image processing circuitry 320. In such embodiments, the image processing performed by the image processing circuitry 320 may be based on the image analysis data.

Figure 7:
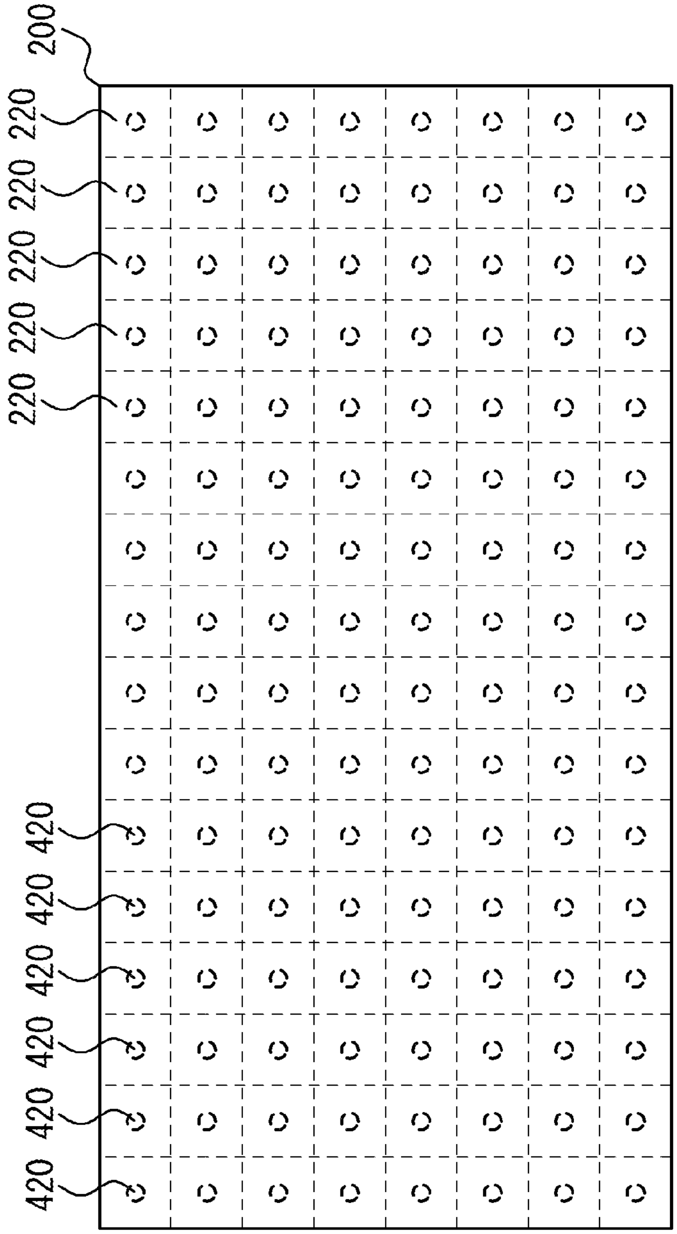
FIG. 7 shows an example definition of zones for a display panel, according to one or more embodiments.

In one or more embodiments, the image analysis performed by the image analysis circuitry 340 may be based on a plurality of "zones" defined for the display panel 200. FIG. 7 shows an example definition of zones 220 for the display panel 200, according to one or more embodiments. In the shown embodiment, the zones 220 are defined by partitioning the display panel 200. In embodiments where the display panel 200 is not rectangular, the zones 220 may be defined by partitioning a rectangular area that circumscribes the display panel 200. In the shown embodiment, all of the zones 220 are square in shape. In an alternative embodiment, the zones 220 may be defined to have a different shape. Each zone 220 is defined such that one light source 420 opposes the zone 220 at the center (e.g., the geometric center) of the zone 220. A light source 420 opposes a zone 220 when the projection of the light source 420 onto the display panel 200 falls within the zone 220.

In one or more embodiments, the image analysis data generated by the image analysis circuitry 340 may include average picture levels (APLs) of the respective zones 220 calculated based on the raw pixel data or the processed pixel data. The APL of a particular zone 220 may be calculated based on the raw pixel data or the processed pixel data for the pixels located in the zone 220. In one implementation, the APL of a particular zone 220 may be the average of the luminance levels of the pixels located in the zone 220. In embodiments where the raw pixel data (or the processed pixel data) for each pixel includes R, G, and B grey levels that specify the luminance of the R, G, and B subpixels, respectively, the luminance level of each pixel may be calculated based on the R, G, and B grey levels. The luminance level of each pixel may be calculated as a weighted sum of the R, G, and B grey levels of each pixel. The backlight control circuitry 350 may be configured to control the luminance level of each light source 420 based on the APL of the zone 220 that each light source 420 opposes.

Figure 8:
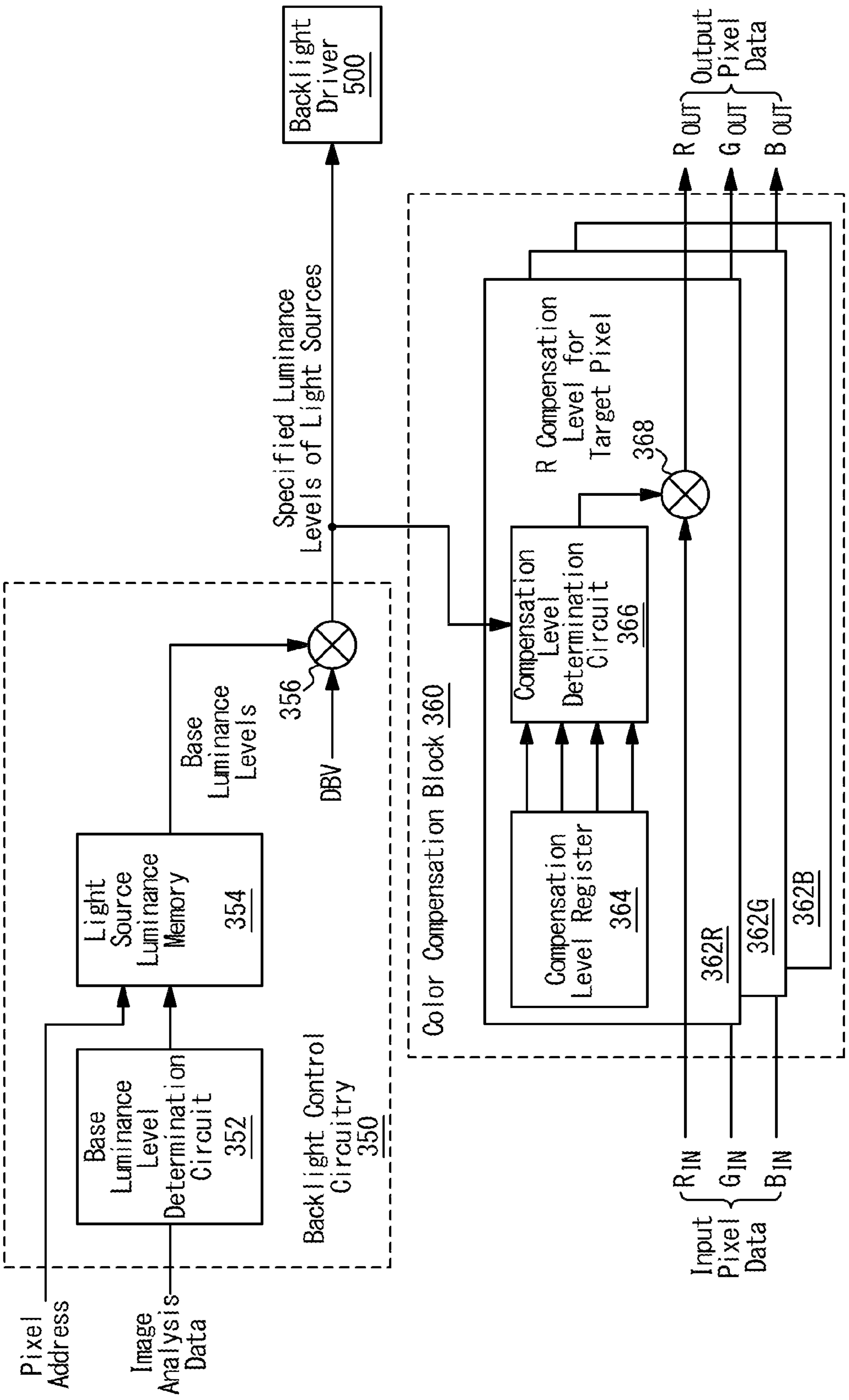
FIG. 8 shows example configurations of backlight control circuitry and a color compensation block, according to one or more embodiments.

FIG. 8 shows example configurations of the backlight control circuitry 350 and the color compensation block 360, according to one or more embodiments. In the shown embodiment, the backlight control circuitry 350 is configured to determine specified luminance levels of the respective light sources 420 based on the image analysis data received from the image analysis circuitry 340 and provide the specified luminance levels to the backlight driver 500. The backlight driver 500 is configured to control the luminance levels of the respective light sources 420 according to the specified luminance levels of the respective light sources 420. The backlight control circuitry 350 is further configured to provide the specified luminance levels of the respective light sources 420 to the color compensation block 360.

In the shown embodiment, the backlight control circuitry 350 includes a base luminance level determination circuit 352, a light source luminance memory 354, and a modification circuit 356. The base luminance level determination circuit 352 is configured to determine base luminance levels of the respective light sources 420 based on the image analysis data received from the image analysis circuitry 340. In embodiments where the image analysis data includes the APLs of the respective zones 220, the base luminance level determination circuit 352 may be configured to determine the base luminance levels of the respective light sources 420 based on the APLs of the respective zones 220 that the respective light sources 420 oppose. In one implementation, the base luminance level of a particular light source 420 may increase with an increase in the APL of the corresponding zone 220 that the particular light source 420 opposes. The base luminance level determination circuit 352 is further configured to forward and store the determined base luminance levels of the respective light sources 420 in the light source luminance memory 354.

The modification circuit 356 is configured to retrieve the base luminance levels of the respective light sources 420 from the light source luminance memory 354 and determine the specified luminance levels of the respective light sources 420 by modifying the base luminance levels of the respective light sources 420 based on a display brightness value (DBV). The DBV specifies a desired display brightness level, which may be a desired overall brightness level of the display image displayed on the display panel 200. The modification circuit 356 may be configured to determine a modification coefficient based on the DBV and determine the specified luminance levels of the respective light sources 420 by applying the modification coefficient to the base luminance levels of the respective light sources 420. In one implementation, the modification circuit 356 may be configured to determine the specified luminance levels of the respective light sources 420 by multiplying the base luminance levels of the respective light sources 420 by the modification coefficient. The modification circuit 356 is further configured to provide the specified luminance levels of the respective light sources 420 to the backlight driver 500 and also to the color compensation block 360.

In one implementation, the DBV may be generated by the image source 600 (shown in FIG. 4) and provided to the modification circuit 356 within the display driver 300. The DBV may be generated based on a user operation. For example, when a command to adjust the brightness level of the display image displayed on the display device 1000 is manually entered into an input device (not shown), the image source 600 may generate the DBV based on this command to adjust the display brightness level. The input device may include a touch panel disposed on at least a portion of the display panel 200, a cursor control device, and mechanical and/or non-mechanical buttons. In an alternative implementation, a different processor or controller may generate and provide the DBV to the display driver 300.

The color compensation block 360 is configured to receive input pixel data and apply the color compensation to the input pixel data for the respective pixels to generate output pixel data for the respective pixels. The input pixel data may be the raw pixel data or may be generated by applying one or more other image processes (e.g., color adjustment, demura correction, deburn correction, image scaling) to the raw pixel data by the image processing circuitry 320 (shown in FIG. 6). The output pixel data may be used as the processed pixel data provided to the driver circuitry 330, which is configured to update the pixels of the display panel 200 based on the processed pixel data. Alternatively, the output pixel data may be further processed (e.g., color adjustment, demura correction, deburn correction, image scaling, gamma transformation or other image processing) and then provided to the driver circuitry 330 as the processed pixel data.

The color compensation performed by the color compensation block 360 is based on the specified luminance levels of the respective light sources 420 received from the backlight control circuitry 350. In one implementation, the color compensation block 360 may be configured to process input pixel data for a target pixel located in a particular zone 220 based on the specified luminance level of the light source 420 that corresponds to or opposes the particular zone 220 to generate the output pixel data for the target pixel located in the particular zone 220. The processing of the input pixel data for the target pixel located in the particular zone 220 may further be based on the specified luminance levels of one or more light sources 420 that oppose one or more zones 220 adjacent to the particular zone 220.

The color compensation is achieved by individually processing the R, G, and B grey levels $R_{IN}$, $G_{IN}$, and $B_{IN}$ of the input pixel data and thereby determining the R, G, and B grey levels $R_{OUT}$, $G_{OUT}$, and $B_{OUT}$ of the output pixel data, respectively. For simplicity, the R, G, and B grey levels $R_{IN}$, $G_{IN}$, and $B_{IN}$ of the input pixel data may also be referred to as the R, G, and B input grey levels $R_{IN}$, $G_{IN}$, and $B_{IN}$, respectively, and the R, G, and B grey levels $R_{OUT}$, $G_{OUT}$, and $B_{OUT}$ of the output pixel data may also be referred to as the R, G, and B output grey levels $R_{OUT}$, $G_{OUT}$, and $B_{OUT}$, respectively. In various implementations, a change in a first one of the R, G, and B output grey levels $R_{OUT}$, $G_{OUT}$, and $B_{OUT}$ with respect to the specified luminance level may be different than a change in a second one of the R, G, and B output grey levels $R_{OUT}$, $G_{OUT}$, and $B_{OUT}$ with respect to the specified luminance level for the same value of the input grey levels $R_{IN}$, $G_{IN}$, and $B_{IN}$. For example, to compensate for the coloration that makes the display image undesirably reddish, the change in the R output grey level $R_{OUT}$ with respect to the specified luminance level may be different from changes in the G and B output grey levels $G_{OUT}$ and $B_{OUT}$ with respect to the specified luminance level for the same value of the input grey levels $R_{IN}$, $G_{IN}$, and $B_{IN}$. The difference in the changes in the R, G, and B output grey levels $R_{OUT}$, $G_{OUT}$, and $B_{OUT}$ with respect to the specified luminance level may achieve desired color compensation.

In some embodiments, as discussed in relation to FIG. 3, the x coordinate of color of light emitted from the light sources 420 in the Yxy color space may increase as the specified luminance levels of the light sources 420 decrease in the in-use range 122. It is noted that the increase in the x coordinate in the Yxy color space means an increase in the red component of the color. In such embodiments, the R output grey level may be determined to be less than the R input grey level. Determining the R output grey level to be less than the R input grey level may mitigate coloration that makes the display image undesirably reddish.

In the shown embodiment, the color compensation block 360 includes an R compensation block 362R, a G compensation block 362G, and a B compensation block 362B which are configured to process the R, G, and B input grey levels, respectively. The R compensation block 362R includes a compensation level register 364, a compensation level determination circuit 366, and a modification circuit 368. Although not shown, the G compensation block 362G and the B compensation block 362B may be configured identically to the R compensation block 362R. Each of the G compensation block 362G and the B compensation block 362B may include a compensation level register, a compensation level determination circuit, and a modification circuit which corresponds to the compensation level register 364, the compensation level determination circuit 366, and the modification circuit 368 of the R compensation block 362R.

The compensation level register 364 of the R compensation block 362R is configured to store compensation level correlation information indicative of the correlation between the specified luminance levels and compensation levels to be applied to R input grey levels of respective pixels. The compensation level determination circuit 366 is configured to determine compensation levels for the R input grey levels of the respective pixels based on the specified luminance levels of the light sources 420 in accordance with the compensation level correlation information. In some embodiments, the compensation level correlation information stored in the compensation level register 364 may include compensation levels for some but not all of the allowed specified luminance levels. In one implementation, the compensation level correlation information may include compensation levels for the minimum specified luminance level, the maximum specified luminance level, and one or more intermediate specified luminance levels. The compensation level determination circuit 366 may be configured to determine for compensation levels for all of the allowed specified luminance levels by interpolating the compensation levels included in the compensation level correlation information. The modification circuit 368 is configured to apply the compensation levels to the R input grey levels of the respective pixels to determine the R output grey levels of the respective pixels.

In one implementation, the R output grey level of a target pixel located in a particular zone 220 may be determined as follows. The R compensation block 362R may receive the specified luminance level of the light source 420 that opposes the particular zone 220 in which the target pixel is located. The compensation level determination circuit 366 may determine the compensation level for the target pixel according to the compensation level correlation information stored in the compensation level register 364. The modification circuit 368 may determine the R output grey level of the target pixel by applying the determined compensation level to the R input grey level of the target pixel. In some embodiments, the modification circuit 368 may determine the R output grey level of the target pixel by multiplying the R input grey level of the target pixel by the determined compensation level. In other embodiments, the modification circuit 368 may determine the R output grey level of the target pixel by applying a different arithmetic operation (e.g., addition, subtraction, etc.) to the R input grey level of the target pixel based on the determined compensation level.

The G compensation block 362G and the B compensation block 362B, which process the G and B input grey levels to determine the G and B output grey levels, respectively, are configured to operate similarly to the R compensation block 362R except for that the contents of the compensation level correlation information stored in the compensation level register are different. Each of the G compensation block 362G and the B compensation block 362B includes a compensation level register, a compensation level determination circuit and a modification circuit which are configured to operate identically to the compensation level register 364, the compensation level determination circuit 366, and the modification circuit 368 of the R compensation block 362R, respectively. It is noted, however, that in order to achieve the color compensation, the compensation level correlation information stored in the compensation level registers of the G and B compensation blocks 362G and 362B may indicate a different correlation between the specified luminance levels and compensation levels than the compensation level correlation information stored in the compensation level register 364 of the R compensation block 362R.

Figure 9:
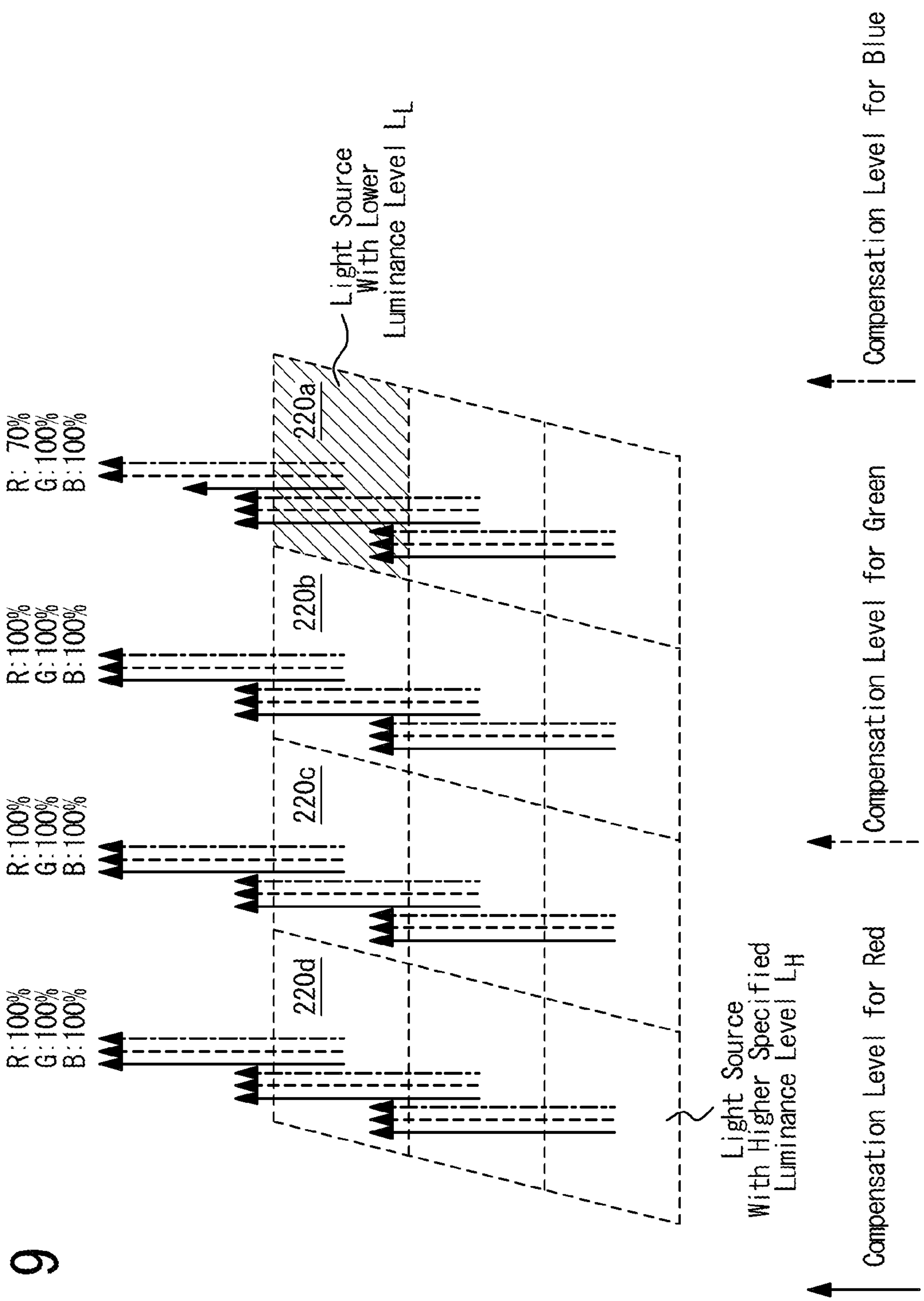
FIG. 9 shows an example relation between compensation levels for red (R), green (G), and blue (B) and specified luminance levels, according to one or more embodiments.

FIG. 9 shows an example relationship between compensation levels for red (R), green (G), and blue (B) and specified luminance levels, according to one or more embodiments. The compensation levels for red, green, and blue may hereinafter be referred to as R, G, and B compensation levels, respectively. The embodiment shown in FIG. 9 may be used in the case where the color of light emitted by light sources becomes reddish as the luminance levels decrease. In the shown embodiment, the specified luminance level for the light source that opposes the zone 220*a* is a lower luminance level $L_L$ and the specified luminance levels for the light sources that oppose the zones 220*b*, 220*c*, and 220*d* are a higher luminance level $L_H$, which is higher than the lower luminance level $L_L$. The R compensation level for the specified luminance level of $L_H$ is "100%", while the R compensation level for the specified luminance level of $L_L$ is "70%", which is smaller than $L_H$. Meanwhile, the G and B compensation levels are "100%" regardless of the specified luminance level. The compensation levels determined as shown in FIG. 9 may prevent the image displayed in the zone illuminated by the light source with the lower specified luminance level from being reddish.

In some embodiments, the compensation levels for a target pixel located in a particular zone may be determined by interpolating the compensation levels determined based on the specified luminance levels of light sources that oppose the particular zone and one or more zones adjacent to the particular zone. An example of the operation of the compensation level determination circuit 366 of the R compensation block 362R according to such embodiments is described below. It is noted that the compensation level determination circuits of the G compensation block 362G and the B compensation block 362B may operate in the same manner as the compensation level determination circuit 366 of the R compensation block 362R.

Figure 10A:
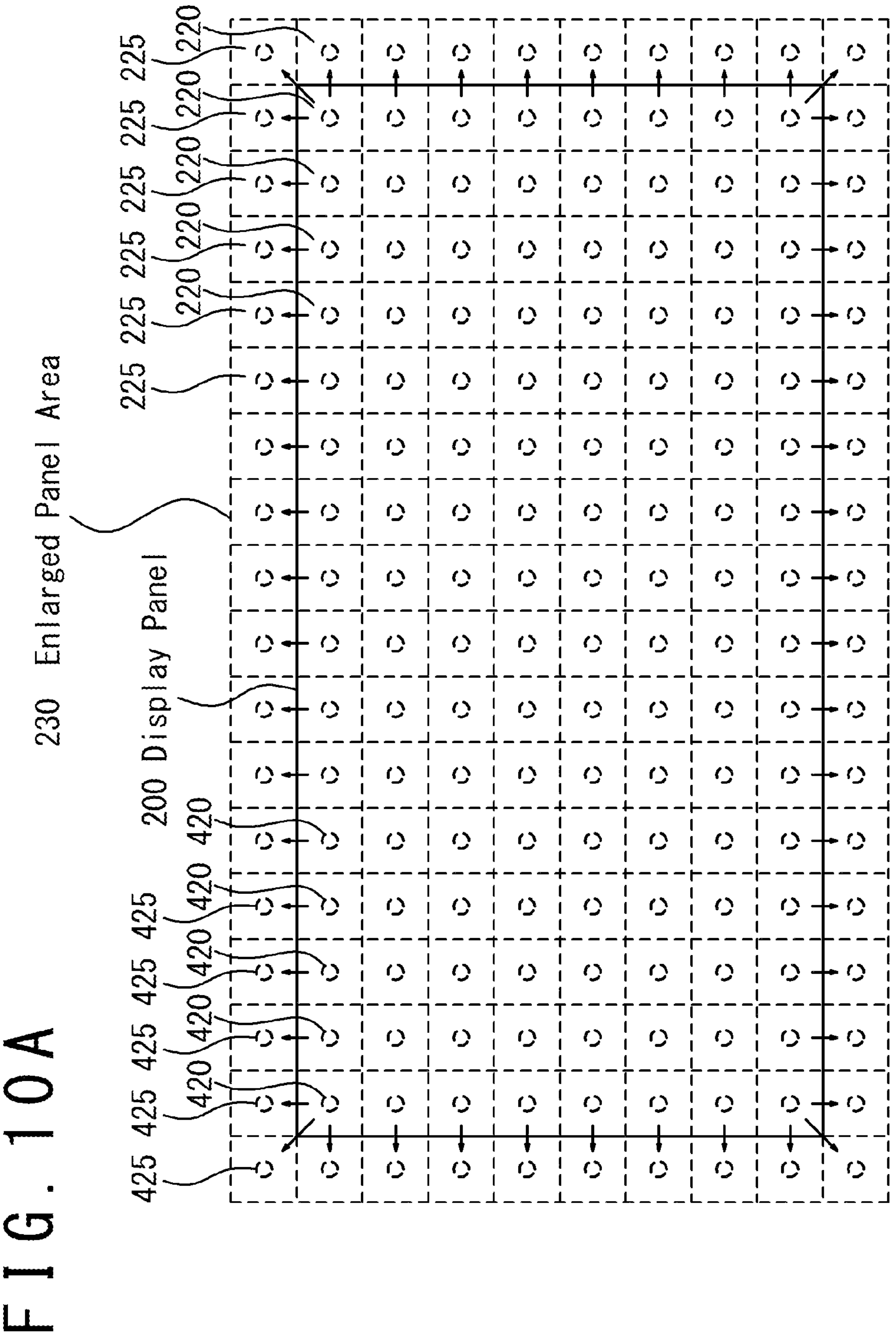
FIG. 10A shows an example definition of an "enlarged" panel area, according to one or more embodiments.

Referring to FIG. 10A, the compensation level determination circuit 366 may be configured to use an "enlarged" panel area 230, which is defined as the entire area of the display panel 200 plus a series of "copied" zones 225 surrounding the display panel 200. It should be noted that the enlarged panel area 230 is hypothetically determined only to facilitate the calculation of the compensation levels, including the interpolation. The copied zones 225 are defined as "copies" of the outermost zones 220 of the display panel 200, assuming that hypothetical light sources 425 oppose the copied zones 225 and emit light with the same specified luminance levels as the light sources 420 that oppose adjacent ones of the outermost zones 220.

Figure 10B:
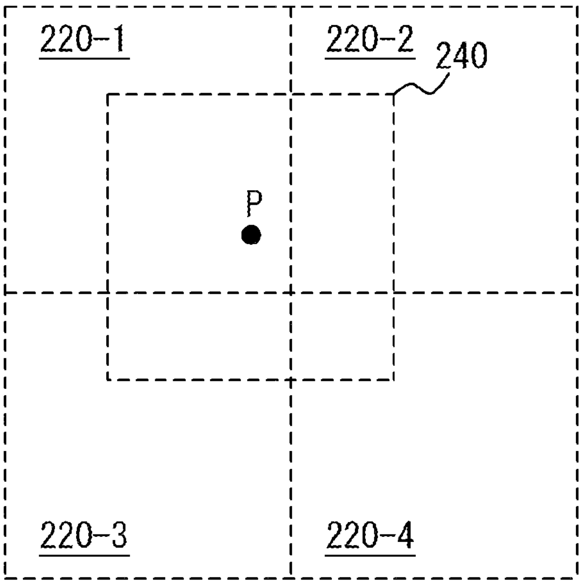
FIG. 10B shows an example definition of "nearby zones" for a target pixel, according to one or more embodiments.

Referring to FIG. 10B, in one implementation, the compensation level determination circuit 366 may be further configured to identify, when determining the compensation level for a target pixel P, four "nearby zones" 220-1, 220-2, 220-3, and 220-4 for the target pixel from among the zones 220 and the copied zones 225. The identification of the "nearby zones" 220-1 to 220-4 may be based on the pixel address of the target pixel P, where the pixel address indicates the location of the target pixel P in the display panel 200. One of the "nearby zones" 220-1 to 220-4 is the zone 220 in which the target pixel P is located and three other nearby zones are three of the zones 220 and the copied zones 225 that are closest to the target pixel P. In the shown embodiment, the "nearby zones" 220-1 to 220-4 for the target pixel P are defined by using a reference region 240, which is a square region having the same dimensions as the zones 220, the geometric center of the reference region 240 being located at the target pixel P. The nearby zones 220-1 to 220-4 may be defined as four of the zones 220 and the copied zones 225 that at least partially overlap the reference region 240. It is noted that one or more of the nearby zones 220-1 to 220-4 may be copied zones 225 if the target pixel P is located in one of the outermost zones 220.

The compensation level determination circuit 326 may further determine compensation levels for pixels located at the centers (e.g., the geographic centers) of the nearby zones based on the specified luminance levels for the light sources 420 (or the hypothetical light sources 425) in accordance with the compensation level correlation information stored in the compensation level register 364. The compensation level determination circuit 326 may further determine the compensation level for the target pixel P by interpolating the compensation levels for the pixels located at the centers of the nearby zones based on the position of the target pixel P.

Figure 10C:
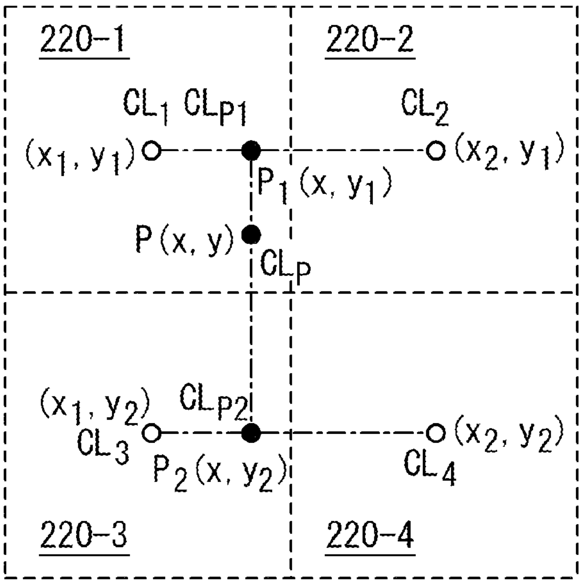
FIG. 10C shows an example of interpolation for determining the compensation level for a target pixel, according to one or more embodiments.

FIG. 10C shows an example of interpolation for determining the compensation level for the target pixel P, according to one or more embodiments. In FIG. 10C, (x, y) is the coordinates of the target pixel P. Further, $(x_1, y_1)$ is the coordinates of the geometric center of the nearby zone 220-1, $(x_2, y_1)$ is the coordinates of the geometric center of the nearby zone 220-2, $(x_1, y_2)$ is the coordinates of the geometric center of the nearby zone 220-3, and $(x_2, y_2)$ is the coordinates of the geometric center of the nearby zone 220-4. $CL_1$, $CL_2$, $CL_3$, and $CL_4$ are the compensation levels of the pixels located at the centers of the nearby zones 220-1, 220-2, 220-3, and 220-4, respectively.

In one or more embodiments, a horizontal interpolation is first implemented to compute horizontally-interpolated compensation levels $L_{P1}$ and $L_{P2}$ for intermediate points $P_1(x, y_1)$ and $P_2(x, y_2)$, and a vertical interpolation is then implemented to compute the compensation level LP for the target pixel P. In one implementation, the horizontally-interpolated compensation levels $CL_{P1}$ and $CL_{P2}$ may be computed according to the following equations (1a) and (1b):

$$CL_{P1} = \frac{x_2 - x}{x_2 - x_1} CL_1 + \frac{x - x_1}{x_2 - x_1} CL_2, \text{ and} \tag{1a}$$

$$CL_{P2} = \frac{x_2 - x}{x_2 - x_1} CL_3 + \frac{x - x_1}{x_2 - x_1} CL_4. \tag{1b}$$

In this case, the compensation level $CL_P$ for the target pixel P may be calculated according to the following equation (2):

$$CL_P = \frac{y - y_2}{y_1 - y_2} L_{P1} + \frac{y_1 - y}{y_1 - y_2} L_{P2}. \tag{2}$$

In alternative embodiments, a vertical interpolation may be first implemented and a horizontal interpolation may be then implemented to calculate the compensation level $CL_P$ for the target pixel P in a similar manner.

Figure 11:
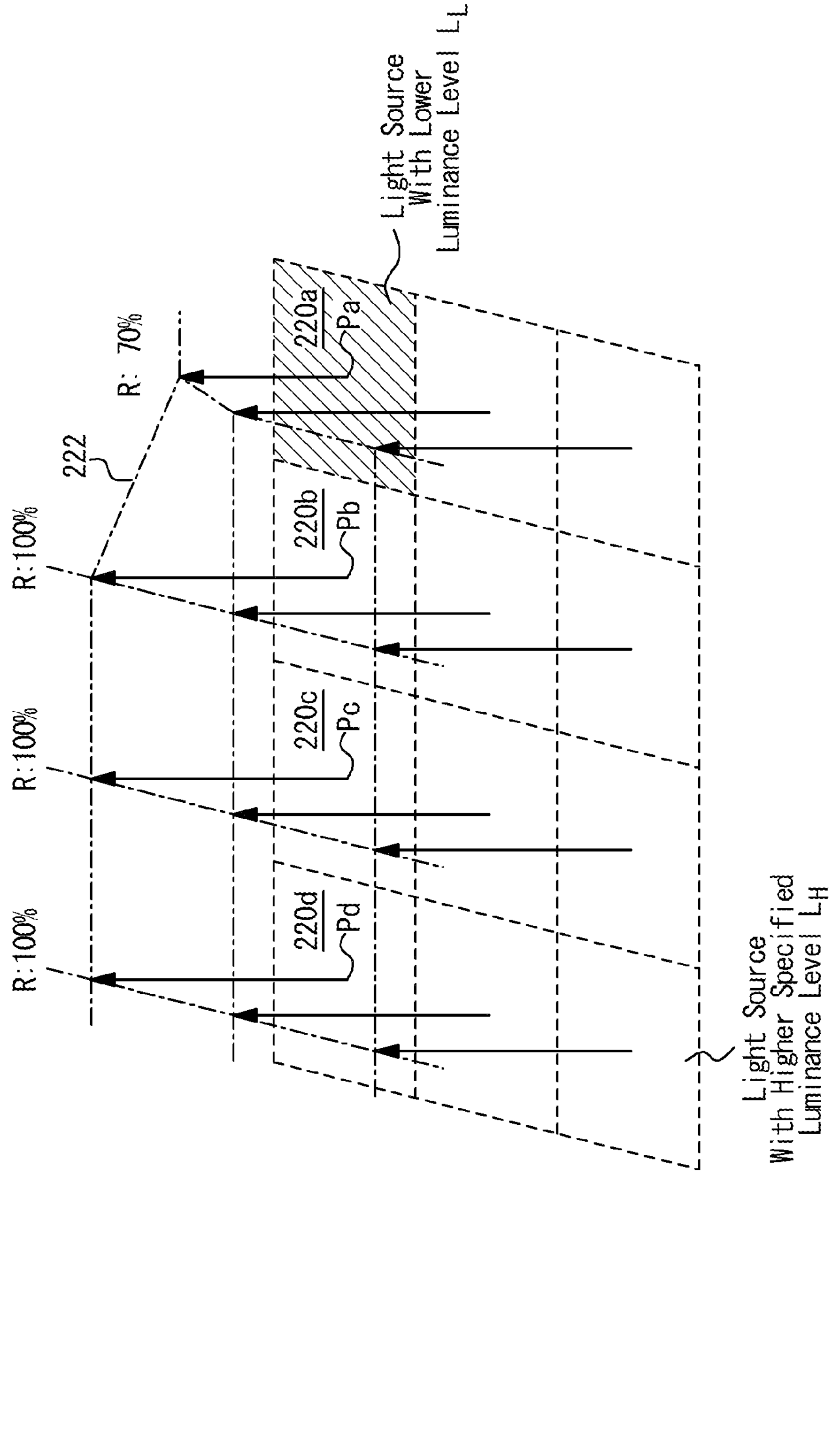
FIG. 11 shows an example of interpolation for determining compensation levels for red (R), according to one or more embodiments.

FIG. 11 shows an example of interpolation for determining R compensation levels, according to one or more embodiments. It is noted that, the G and B compensation levels may be determined in a similar manner. In the embodiment shown in FIG. 11, a lower luminance level $L_L$ is specified for the light source that opposes a zone 220*a*, and a higher luminance level $L_H$ is specified for the light sources that oppose zones 220*b*, 220*c*, and 220*d*. The R compensation level for the pixel Pa located at the center of the zone 220*a* is "70%" and the R compensation levels for the pixels Pb, Pc, and Pd located at the centers of zones 220*b*, 220*c*, and 220*d* are "100%". The chain line 222 represents an interpolation for determining the R compensation levels for pixels located between the pixels Pa and Pd. As a result of the interpolation, the R compensation levels for pixels located between the pixels Pa and Pb are closer to "70%" as the pixels are located closer to the pixel Pa, and closer to "100%" as the pixels are located closer to the pixel Pb. The R compensation levels for pixels located between the pixels Pb and Pd are "100%" because the R compensation levels for the pixels Pb and Pd are both "100%".

Figure 12:
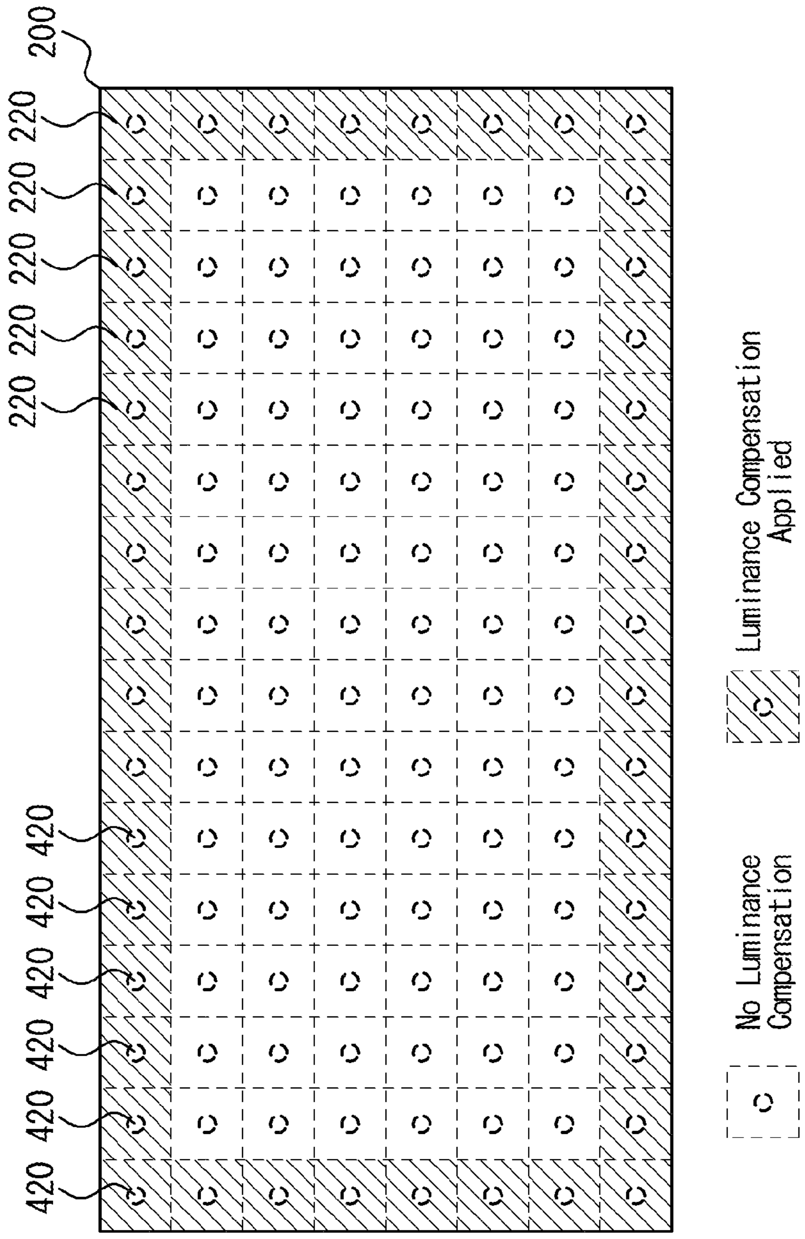
FIG. 12 shows zones where the display image may have a reduced brightness level.

Referring to FIG. 12, the display image may have a reduced brightness level near the edges of the display panel 200, particularly when the light sources 420 are arranged in a regular array at regular intervals. In FIG. 12, the hatching indicates the zones 220 where the display image may have a reduced brightness level. Because the light emitted from the light sources 420 expands as the light travels towards the display panel 200, each zone 220 may receive light not only from the light source 420 that opposes that zone 220 but also one or more light sources 420 that oppose one or more zones 220 located around that zone 220. Accordingly, the number of light sources 420 from which each zone 220 receives light may vary depending on the location of that zone 220. For example, the zones 220 at the edges of the display panel 200 may receive light from a smaller number of light sources 420 than the zones 220 located in the interior portion of the display panel 200. The zones 220 located at the corners of the display panel 200 may receive light from an even smaller number of light sources 420. The variation in the number of light sources 420 from which each zone 220 receives light results from a variation in the arrangement of light sources 420 around that zone 220 depending on the location of that zone 220. Such a variation in the number of light sources 420 from which each zone 220 receives light may result in a decrease in the brightness level of the peripheral portion of the display panel 200, resulting in an uneven image brightness.

To mitigate the effect of the variation in the number of light sources 420 from which each zone 220 receives light, in one or more embodiments, the specified luminance level of each light source 420 may be determined based on the arrangement of one or more light sources 420 around the zone 220 that each light source 420 opposes. In one implementation, the specified luminance level of a light source 420 that opposes a particular zone 220 may be adjusted based on the number of light sources 420 that are arranged around the particular zone 220.

Figure 13:
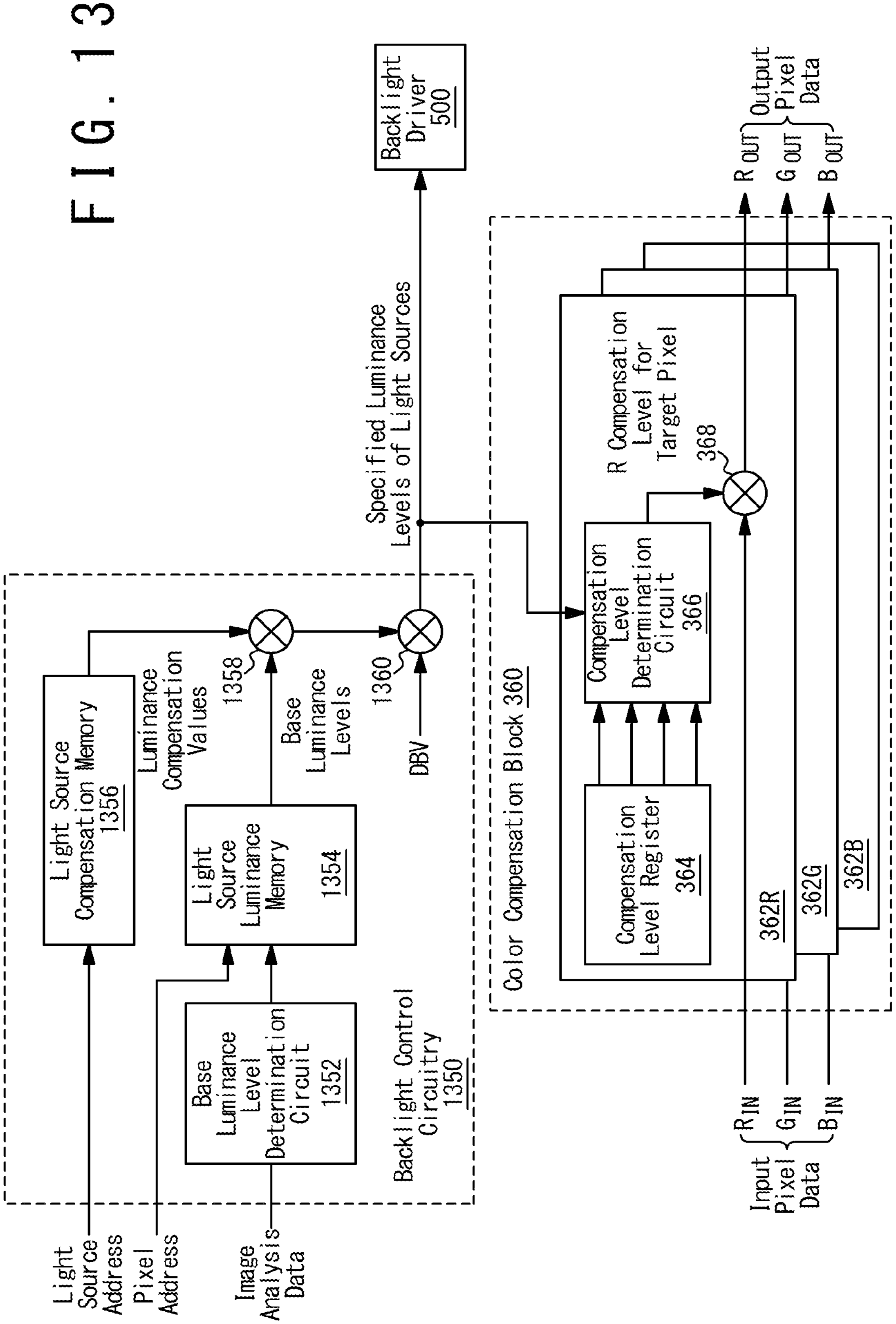
FIG. 13 shows an example configuration of backlight control circuitry, according to other embodiments.

FIG. 13 shows an example configuration of backlight control circuitry 1350 adapted to adjust the specified luminance level of each light source 420 to compensate for the uneven image brightness near the edges of the display panel 200, according to other embodiments. The backlight control circuitry 1350 is configured to determine the specified luminance levels of the respective light sources 420 based on the locations (e.g., at the edges, corners, or in the interior portion of the display panel 200) of the light sources 420.

In the shown embodiment, the backlight control circuitry 1350 includes a base luminance level determination circuit 1352, a light source luminance memory 1354, and a light source compensation memory 1356, a first modification circuit 1358, and a second modification circuit 1360. The base luminance level determination circuit 1352 and the light source luminance memory 1354 are configured to operate in the same manner as the base luminance level determination circuit 352 and the light source luminance memory 354 shown in FIG. 8. The base luminance level determination circuit 1352 is configured to determine base luminance levels of the respective light sources 420 based on the image analysis data received from the image analysis circuitry 340. In embodiments where the image analysis data includes the APLs of the respective zones 220, the base luminance level determination circuit 1352 may be configured to determine the base luminance levels of the respective light sources 420 based on the APLs of the respective zones 220 that the respective light sources 420 oppose. The base luminance level determination circuit 1352 is further configured to forward and store the determined base luminance levels of the respective light sources 420 in the light source luminance memory 1354.

The light source compensation memory 1356 is configured to store luminance compensation values for the respective light sources 420 to be applied to the base luminance levels of the respective light sources 420. The luminance compensation values for the respective light sources 420 are predetermined to compensate for the image brightness unevenness discussed above based on the locations of the respective light sources 420. In one implementation, the luminance compensation value for a particular light source 420 may be determined based on an arrangement of one or more light sources 420 around the particular light source 420. For example, the luminance compensation value for a light source 420 that opposes a particular zone 220 may be determined based on whether the particular zone 220 is located at an edge of the display panel 200, at a corner of the display panel 200, or in the interior portion of the display panel 200. The luminance compensation values thus determined may effectively compensate for the unevenness of the display panel 200, which may be caused by a decrease in the brightness level of the peripheral portion of the display panel 200.

The first modification circuit 1358 and the second modification circuit 1360 are collectively configured to determine the specified luminance levels of the respective light sources 420 based on the base luminance levels stored in the light source luminance memory 1354, the luminance compensation values stored in the light source compensation memory 1356, and the DBV.

The first modification circuit 1358 is configured to retrieve the base luminance levels of the respective light sources 420 from the light source luminance memory 1354 and also retrieve the luminance compensation values for the respective light sources 420 from the light source compensation memory 1356. The first modification circuit 1358 is further configured to modify the base luminance levels of the respective light sources 420 based on the luminance compensation values for the respective light sources 420 and provide the modified base luminance levels of the respective light sources 420 to the second modification circuit 1360. In one implementation, the first modification circuit 1358 may be configured to modify the base luminance levels of the respective light sources 420 by multiplying the base luminance levels of the respective light sources 420 by the luminance compensation values for the respective light sources 420. In an alternative implementation, the first modification circuit 1358 may be configured to modify the base luminance levels of the respective light sources 420 by applying a different arithmetic operation (e.g., addition or subtraction) based on the luminance compensation values for the respective light sources 420.

The second modification circuit 1360 is configured to determine the specified luminance levels of the respective light sources 420 by further modifying the modified base luminance levels of the respective light sources 420 based on a DBV that specifies a desired display brightness level. The second modification circuit 1360 may be configured to determine a modification coefficient based on the DBV and determine the specified luminance levels of the respective light sources 420 by applying the modification coefficient to the base luminance levels of the respective light sources 420. In one implementation, the second modification circuit 1360 may be configured to determine the specified luminance levels of the respective light sources 420 by multiplying the base luminance levels of the respective light sources 420 by the modification coefficient. The second modification circuit 1360 is further configured to provide the specified luminance levels of the respective light sources 420 to the backlight driver 500 and also to the color compensation block 360. The color compensation block 360 is configured to apply the color compensation to the input pixel data for the respective pixels based on the specified luminance levels of the respective light sources 420 to generate the output pixel data for the respective pixels.

Figure 14:
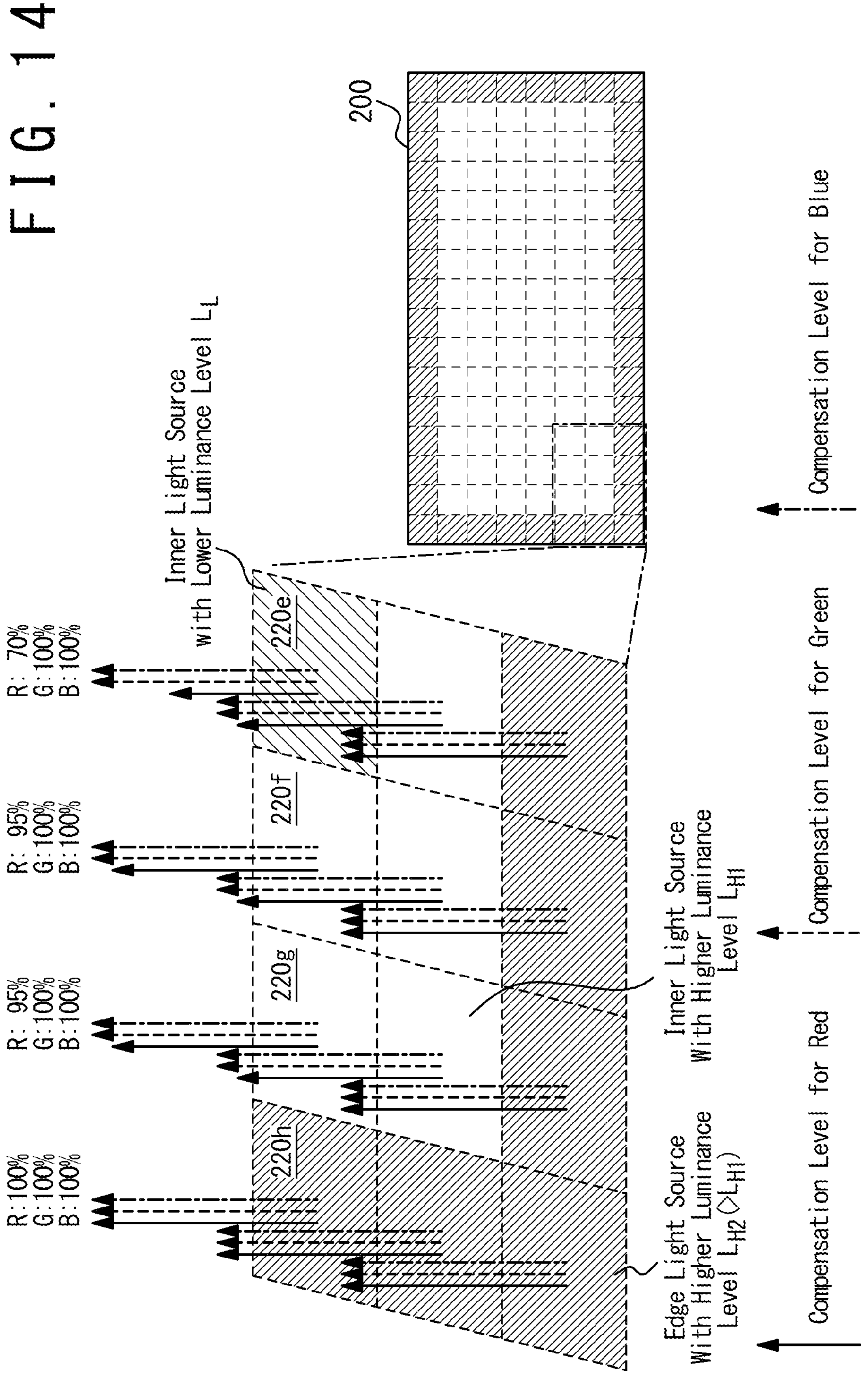
FIG. 14 shows an example relation between compensation levels for red (R), green (G), and blue (B) and specified luminance levels, according to one or more embodiments.

FIG. 14 shows an example relationship between compensation levels for red (R), green (G), and blue (B) and specified luminance levels in embodiments where the specified luminance levels are determined to mitigate the decrease in the brightness level of the display image near the edges of the display panel. In the shown embodiment, the specified luminance level of the light source that opposes the zone 220*e*, which is located at an inner location of the display panel 200, is a lower luminance level $L_L$. The specified luminance level of the light sources that oppose the zones 220*f* and 220*g*, which are also located at inner locations of the display panel 200, is a higher luminance level $L_{H1}$, which is higher than the lower luminance level $L_L$. The specified luminance level of the light source that opposes the zone 220*h*, which is located at an edge of the display panel 200, is a higher luminance level $L_{H2}$ which is higher than the higher luminance level $L_{H1}$ to compensate for the decrease in the brightness level near the edge of the display panel 200.

In the shown embodiment, the R compensation level for the specified luminance level of $L_L$ is "70%" and the compensation levels for red for the specified luminance levels of $L_{H1}$ and $L_{H2}$ are "95%" and "100%", respectively. Meanwhile, the compensation levels for green (G) and blue (B) are "100%" regardless of the specified luminance level. The compensation levels determined as shown in FIG. 14 may prevent the image displayed in the zone illuminated by the light source with the lower specified luminance level from being reddish.

Figure 15:
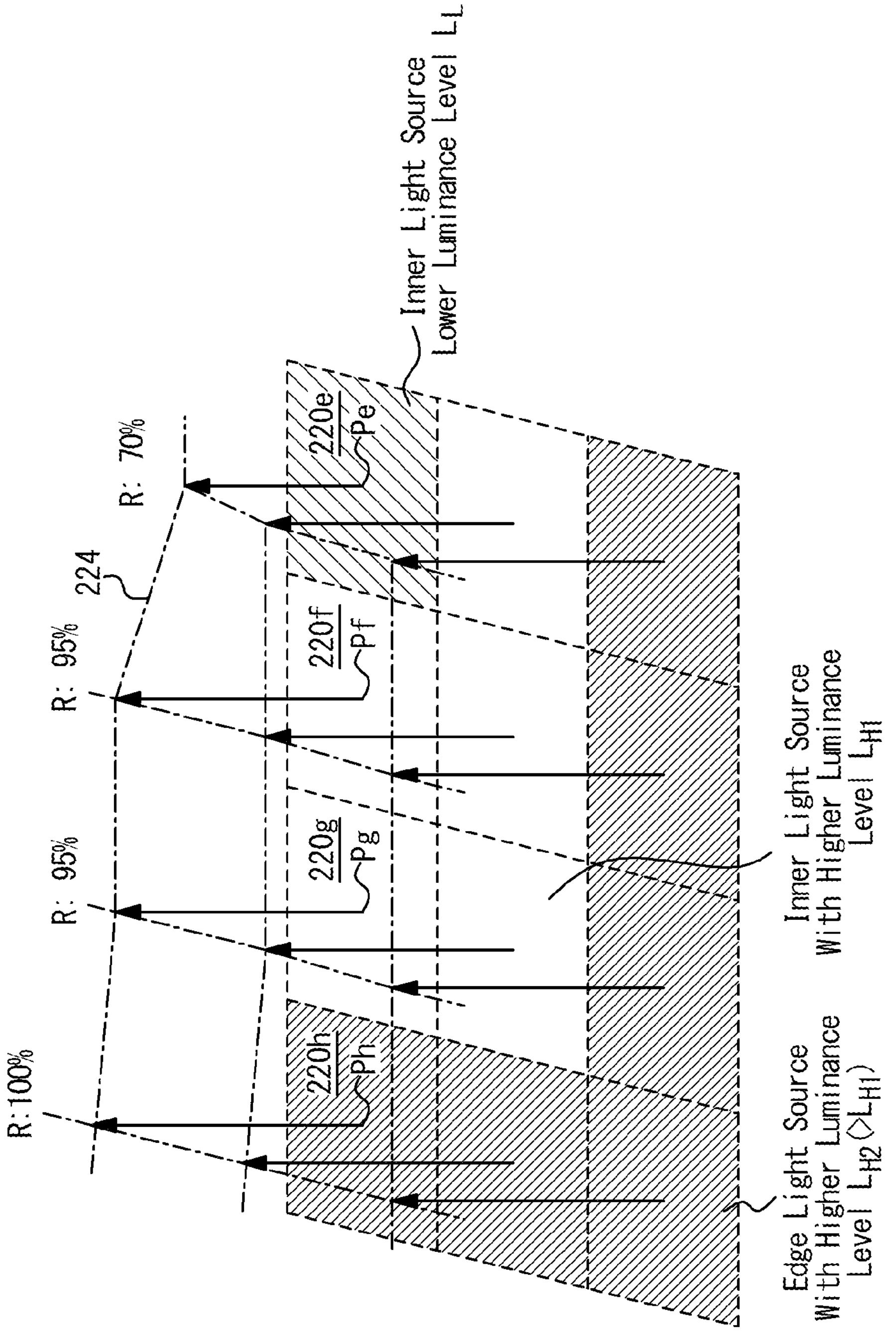
FIG. 15 shows an example of interpolation for determining compensation levels for red (R), according to one or more embodiments.

FIG. 15 shows an example of interpolation for determining compensation levels for red (R) for the case shown in FIG. 14, according to one or more embodiments. It is noted that the compensation levels for green (G) and blue (B) may be determined in a similar manner. In the shown embodiment, the R compensation level for the pixel Pe located at the center of the zone 220*e* is "70%", the R compensation levels for pixels Pf and Pg located at the centers of the zones 220*f* and 200*g* is "95%", and the R compensation levels for the pixel Ph located at the center of the zone 220*h* is "100%". The chain line 224 represents an interpolation for determining the R compensation levels for pixels located between the pixels Pe and Ph. As a result of the interpolation, the R compensation levels for pixels located between the pixels Pe and Pf are closer to "70%" as the pixels are located closer to the pixel Pe, and closer to "95%" as the pixels are located closer to the pixel Pf. The compensation levels for pixels located between the pixels Pf and Pg are "95%" because the R compensation levels for pixels Pf and Pg located at the centers of the zones 220*f* and 200*g* are both "95%". The R compensation levels for pixels located between the pixels Pg and Ph are closer to "95%" as the pixels are located closer to the pixel Pg, and closer to "100%" as the pixels are located closer to the pixel Ph.

Figure 16:
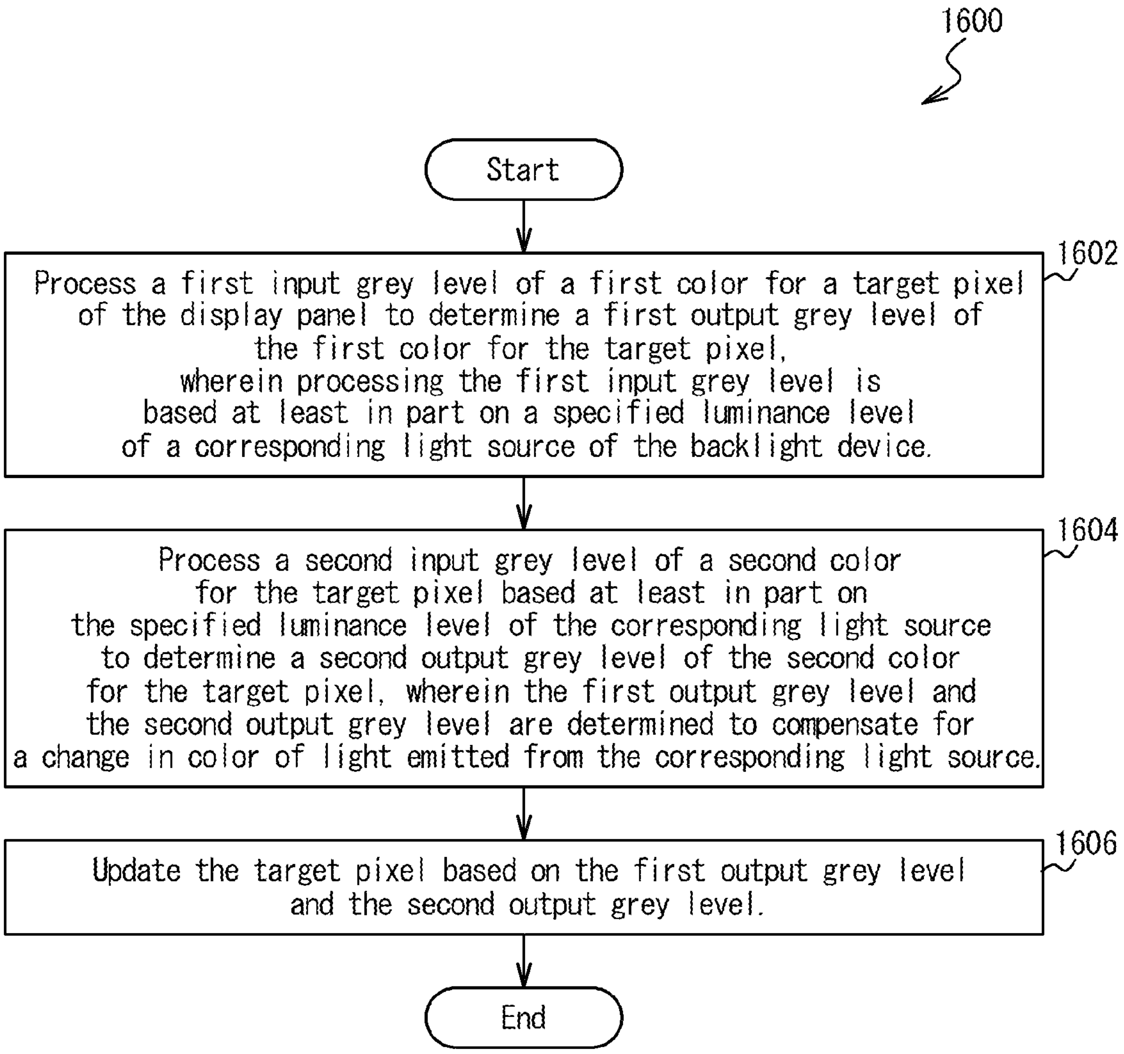
FIG. 16 is a flowchart showing an example method for color compensation, according to one or more embodiments.

FIG. 16 is a flowchart showing an example method 1600 for color compensation, according to one or more embodiments. While the various steps in the flowchart are presented and described sequentially, one of ordinary skill will appreciate that some or all of the steps may be executed in different order, may be combined or omitted, and some or all of the steps may be executed in parallel. Additional steps may further be performed. Accordingly, the scope of the disclosure should not be considered limited to the specific arrangement of steps shown in FIG. 16.

In one or more embodiments, the method 1600 provides color compensation for a display device that includes a display panel illuminated by a backlight device including a plurality of light sources configured such that the color of light emitted from the plurality of light sources varies with luminance levels of the plurality of light sources. FIGS. 4 and 5 show an example of such a display device, according to one or more embodiments. In the display device 1000 shown in FIGS. 4 and 5, the display panel 200 is illuminated by the backlight device 400 including the array of light sources 420. The x and y coordinates of the color of the light emitted by the light sources 420 in the Yxy color space may change with respect to the luminance levels as shown in FIG. 3.

The method 1600 shown in FIG. 16 includes processing, at step 1602, a first input grey level of a first color for a target pixel of the display panel to determine a first output grey level of the first color for the target pixel. The processing of the first input grey level is based at least in part on a specified luminance level of a corresponding light source of the plurality of light sources. The method 1600 further includes processing, at step 1604, a second input grey level of a second color for the target pixel based at least in part on the specified luminance level of the corresponding light source to determine a second output grey level of the second color for the target pixel. The first output grey level and the second output grey level are determined to compensate for a change in color of light emitted from the corresponding light source.

Steps 1602 and 1604 may be implemented by the color compensation block 360 shown in FIG. 8. The R compensation block 362R of the color compensation block 360 processes the R input grey level (which may correspond to the first input grey level) for the target pixel to determine the R output grey level (which may correspond to the first output grey level). The G compensation block 362G of the color compensation block 360 processes the G input grey level (which may correspond to the second input grey level) for the target pixel to determine the G output grey level (which may correspond to the second output grey level). The B compensation block 362B of the color compensation block 360 processes the B input grey level for the target pixel to determine the B output grey level. In one implementation, the R, G, and B output grey levels of the target pixel are determined to compensate for a change in color of light emitted from the corresponding light source 420 as shown in FIG. 3.

Referring back to FIG. 16, the method 1600 further includes update the target pixel based on the first output grey level and the second output grey level at step 1606. In one embodiment, the update of the target pixel may be performed by the driver circuitry 330 shown in FIG. 6.

While many embodiments have been described, those skilled in the art, having benefit of this disclosure, will appreciate that other embodiments can be devised which do not depart from the scope. Accordingly, the scope of the invention should be limited only by the attached claims.

What is claimed is:

1. A display device, comprising:

a display panel;

a backlight device comprising a plurality of light sources to illuminate the display panel, wherein the plurality of light sources are configured such that color of light emitted from the plurality of light sources varies with luminance levels of the plurality of light sources; and a display driver configured to:

process a first input grey level of a first color for a target pixel of the display panel based at least in part on a specified luminance level of a corresponding light source of the plurality of light sources to determine a first output grey level of the first color for the target pixel, wherein the first color is red, wherein an x coordinate of color of light emitted from the corresponding light source in an Yxy color space increases as the specified luminance level of the corresponding light source decreases in an in-use range of the specified luminance level, and wherein the first output grey level of the first color is less than the first input grey level of the first color, process a second input grey level of a second color for the target pixel based at least in part on the specified luminance level of the corresponding light source to determine a second output grey level of the second color for the target pixel, wherein the first output grey level and the second output grey level are determined to compensate for a change in color of light emitted from the corresponding light source, and update the target pixel based on the first output grey level and the second output grey level.

2. The display device of claim 1, wherein the corresponding light source is configured to illuminate the target pixel.

3. The display device of claim 1, wherein a change in the first output grey level with respect to the specified luminance level is different than a change in the second output grey level with respect to the specified luminance level for a same value of the first input grey level and the second input grey level.

4. The display device of claim 1, wherein processing the first input grey level of the first color comprises:

determining a first compensation level based on the specified luminance level of the corresponding light source; and determining the first output grey level of the first color by applying the first compensation level to the first input grey level of the first color.

5. The display device of claim 4, wherein processing the second input grey level of the second color comprises:

determining a second compensation level based on the specified luminance level of the corresponding light source, wherein the second compensation level is different than the first compensation level; and determining the second output grey level of the first color by applying the second compensation level to the second input grey level of the second color.

6. The display device of claim 1, wherein the display driver is further configured to determine the specified luminance level based on pixel data of pixels located in a zone that the corresponding light source opposes.

7. The display device of claim 6, wherein determining the specified luminance level is based on an arrangement of one or more light sources around the zone.

8. A display driver, comprising:

a color compensation block configured to:

process a first input grey level of a first color for a target pixel of a display panel to determine a first output grey level of the first color for the target pixel, the display panel being illuminated by a backlight device comprising a plurality of light sources configured such that color of light emitted from the plurality of light sources varies with luminance levels of the plurality of light sources, wherein processing the first input grey level is based at least in part on a specified luminance level of a corresponding light source of the plurality of light sources, wherein the first color is red, wherein an x coordinate of color of light emitted from the corresponding light source in an Yxy color space increases as the specified luminance level of the corresponding light source decreases in an in-use range of the specified luminance level, and wherein the first output grey level of the first color is less than the first input grey level of the first color, and process a second input grey level of a second color for the target pixel based at least in part on the specified luminance level of the corresponding light source to determine a second output grey level of the second color for the target pixel, wherein the first output grey level and the second output grey level are determined to compensate for a change in color of light emitted from the corresponding light source; and driver circuitry configured to update the target pixel based on the first output grey level and the second output grey level.

9. The display driver of claim 8, wherein the corresponding light source is configured to illuminate the target pixel.

10. The display driver of claim 8, wherein a change in the first output grey level with specified luminance level is different than a change in the second output grey level with the specified luminance level for a same value of the first input grey level and the second input grey level.

11. The display driver of claim 8, wherein processing the first input grey level of the first color comprises:

determining a first compensation level based on the specified luminance level of the corresponding light source; and determining the first output grey level of the first color by applying the first compensation level to the first input grey level of the first color.

12. The display driver of claim 11, wherein processing the second input grey level of the second color comprises:

determining a second compensation level based on the specified luminance level of the corresponding light source, wherein the second compensation level is different than the first compensation level; and determining the second output grey level of the first color by applying the second compensation level to the second input grey level of the second color.

13. The display driver of claim 8, further comprises backlight control circuitry configured to determine the specified luminance level based on pixel data of pixels located in a zone that the corresponding light source opposes.

14. The display driver of claim 13, wherein determining the specified luminance level is based on an arrangement of one or more light sources around the zone.

15. A method, comprising:

processing a first input grey level of a first color for a target pixel of a display panel to determine a first output grey level of the first color for the target pixel, the display panel being illuminated by a backlight device comprising a plurality of light sources configured such that color of light emitted from the plurality of light sources varies with luminance levels of the plurality of light sources, wherein processing the first input grey level is based at least in part on a specified luminance level of a corresponding light source of the plurality of light sources, wherein the first color is red, wherein an x coordinate of color of light emitted from the corresponding light source in an Yxy color space increases as the specified luminance level of the corresponding light source decreases in an in-use range of the specified luminance level, and wherein the first output grey level of the first color is less than the first input grey level of the first color;

processing a second input grey level of a second color for the target pixel based at least in part on the specified luminance level of the corresponding light source to determine a second output grey level of the second color for the target pixel, wherein the first output grey level and the second output grey level are determined to compensate for a change in color of light emitted from the corresponding light source; and updating the target pixel based on the first output grey level and the second output grey level.

16. The method of claim 15, wherein the corresponding light source is configured to illuminate the target pixel.

17. The method of claim 15, wherein a change in the first output grey level with specified luminance level is different than a change in the second output grey level with the specified luminance level for a same value of the first input grey level and the second input grey level.

* * * * *